United States Patent
Hicks

(10) Patent No.: US 9,448,643 B2
(45) Date of Patent: Sep. 20, 2016

(54) STYLUS SENSITIVE DEVICE WITH STYLUS ANGLE DETECTION FUNCTIONALITY

(71) Applicant: Barnes & Noble College Booksellers, LLC, Basking Ridge, NJ (US)

(72) Inventor: Kourtny M. Hicks, Sunnyvale, CA (US)

(73) Assignee: BARNES & NOBLE COLLEGE BOOKSELLERS, LLC, Basking Ridge, NJ (US)

( * ) Notice: Subject to any disclaimer, the term of this patent is extended or adjusted under 35 U.S.C. 154(b) by 448 days.

(21) Appl. No.: 13/793,202

(22) Filed: Mar. 11, 2013

(65) Prior Publication Data

US 2014/0253521 A1    Sep. 11, 2014

(51) Int. Cl.
*G06F 3/0354* (2013.01)
*G06F 3/038* (2013.01)

(52) U.S. Cl.
CPC ......... *G06F 3/03545* (2013.01); *G06F 3/0383* (2013.01)

(58) Field of Classification Search
CPC .......................... G09F 3/03545; G09F 3/0488
USPC .................... 345/173–184; 178/18.01–20.04
See application file for complete search history.

(56) References Cited

U.S. PATENT DOCUMENTS

| | | | |
|---|---|---|---|
| 4,896,543 A | 1/1990 | Gullman | |
| 5,633,471 A | 5/1997 | Fukushima | |
| 5,844,557 A | 12/1998 | Shively, II | |
| 6,259,438 B1 | 7/2001 | Fleck et al. | |
| 6,956,564 B1 | 10/2005 | Williams | |
| 7,649,524 B2 | 1/2010 | Haim et al. | |
| 7,756,364 B2 * | 7/2010 | Slatter | G06F 3/0317 345/179 |
| 7,840,912 B2 | 11/2010 | Elias et al. | |
| 7,898,541 B2 | 3/2011 | Hong et al. | |
| RE42,738 E | 9/2011 | Williams | |
| 8,059,101 B2 | 11/2011 | Westerman et al. | |

(Continued)

FOREIGN PATENT DOCUMENTS

EP          0722150 A1       7/1996

OTHER PUBLICATIONS

"Adonit Jot Touch (for iPad)," Adonit Jot Touch (for iPad) Review & Rating—PCMag.com; http://www.pcmag.com/article2/0,2817,2411192,00.asp; 6pages, printed from the Internet on Jun. 20, 2013.

(Continued)

*Primary Examiner* — Kumar Patel
*Assistant Examiner* — Vinh Lam
(74) *Attorney, Agent, or Firm* — Finch & Maloney PLLC

(57) ABSTRACT

Techniques are disclosed for performing functions in electronic devices by changing the angle between a stylus and a stylus detection surface of an electronic device. The stylus and/or device can detect the stylus angle of inclination and any changes in stylus angle. Each uniquely identifiable angle change or combination of angle changes may be associated with a distinct device or stylus function. A greater angle change may result in an accelerated function or a different function entirely. The stylus angle gesture may perform functions on selected content or on one or more UI control features or icons on the device. In other cases, functions can be performed without reference to specific content or control features. The various functions assigned to stylus angle gestures may be performed on an application-specific level or a global device level. An animation can be displayed as the stylus gestures are executed.

17 Claims, 10 Drawing Sheets

(56) References Cited

U.S. PATENT DOCUMENTS

| | | | |
|---|---|---|---|
| 8,239,413 B2 | 8/2012 | Hubert | |
| 8,274,536 B2 | 9/2012 | Chaudhri et al. | |
| 8,286,104 B1 | 10/2012 | Yonge-Mallo | |
| D670,713 S | 11/2012 | Cranfill et al. | |
| RE44,103 E | 3/2013 | Williams | |
| 8,400,417 B2 | 3/2013 | Ording et al. | |
| 8,508,494 B2 | 8/2013 | Moore | |
| 8,730,560 B2* | 5/2014 | Sonoda | G02F 1/167 345/107 |
| 9,053,666 B2* | 6/2015 | Minami | G09G 3/3233 |
| 2001/0025289 A1 | 9/2001 | Jenkins et al. | |
| 2002/0116421 A1 | 8/2002 | Fox et al. | |
| 2005/0200292 A1* | 9/2005 | Naugler | G06F 3/042 315/149 |
| 2006/0050081 A1* | 3/2006 | Kobayashi | H01L 27/322 345/597 |
| 2007/0047002 A1 | 3/2007 | Hull et al. | |
| 2007/0176908 A1* | 8/2007 | Lipman | G06F 3/0386 345/179 |
| 2007/0236424 A1* | 10/2007 | Kimura | G09G 3/3233 345/76 |
| 2008/0018563 A1* | 1/2008 | Shinohe | H01J 11/12 345/60 |
| 2008/0036747 A1 | 2/2008 | Hope | |
| 2008/0143649 A1* | 6/2008 | Asaki | H01L 51/5209 345/76 |
| 2009/0167702 A1* | 7/2009 | Nurmi | G06F 3/0346 345/173 |
| 2009/0315821 A1* | 12/2009 | Kwak | G09G 3/3406 345/102 |
| 2010/0007282 A1* | 1/2010 | Yamamoto | G09G 3/22 315/169.1 |
| 2010/0100854 A1 | 4/2010 | Russell et al. | |
| 2010/0177046 A1* | 7/2010 | Shin | G06F 3/0421 345/169 |
| 2010/0192086 A1 | 7/2010 | Kocienda et al. | |
| 2010/0229130 A1 | 9/2010 | Edge et al. | |
| 2010/0259482 A1 | 10/2010 | Ball | |
| 2010/0262659 A1 | 10/2010 | Christiansen et al. | |
| 2010/0318895 A1 | 12/2010 | Steinberger et al. | |
| 2011/0075440 A1* | 3/2011 | Wang | G06F 3/03545 362/553 |
| 2011/0096065 A1* | 4/2011 | Handa | G09G 3/3233 345/212 |
| 2011/0169719 A1* | 7/2011 | Onishi | H01J 1/316 345/55 |
| 2011/0258542 A1 | 10/2011 | Kenney et al. | |
| 2012/0013647 A1* | 1/2012 | Fang | G02B 6/0038 345/690 |
| 2012/0013649 A1* | 1/2012 | Higashi | G09G 3/3426 345/690 |
| 2012/0044140 A1* | 2/2012 | Koyama | G06F 3/0325 345/157 |
| 2012/0056821 A1 | 3/2012 | Goh | |
| 2012/0105503 A1* | 5/2012 | Tada | G02B 6/0038 345/690 |
| 2012/0127110 A1 | 5/2012 | Amm et al. | |
| 2012/0139879 A1 | 6/2012 | Kim et al. | |
| 2012/0221938 A1 | 8/2012 | Patterson et al. | |
| 2012/0235901 A1 | 9/2012 | Binder | |
| 2012/0242579 A1 | 9/2012 | Chua | |
| 2012/0242584 A1 | 9/2012 | Tuli | |
| 2012/0249768 A1 | 10/2012 | Binder | |
| 2012/0274617 A1* | 11/2012 | Fukuda | H01K 1/26 345/205 |
| 2012/0280947 A1 | 11/2012 | Weaver et al. | |
| 2012/0311438 A1 | 12/2012 | Cranfill et al. | |
| 2012/0313865 A1* | 12/2012 | Pearce | G06F 3/0416 345/173 |
| 2012/0329529 A1 | 12/2012 | van der Raadt | |
| 2013/0016045 A1 | 1/2013 | Zhao et al. | |
| 2013/0027441 A1* | 1/2013 | Kabe | G09G 3/3413 345/690 |
| 2013/0036383 A1 | 2/2013 | Yuan et al. | |
| 2013/0063364 A1 | 3/2013 | Moore | |
| 2013/0076632 A1 | 3/2013 | Sirpal et al. | |
| 2013/0076637 A1 | 3/2013 | Teltz | |
| 2013/0076638 A1 | 3/2013 | Sirpal et al. | |
| 2013/0076781 A1 | 3/2013 | Sirpal et al. | |
| 2013/0088464 A1* | 4/2013 | Pearce | G06F 3/03545 345/179 |
| 2013/0113699 A1 | 5/2013 | Lim | |
| 2013/0120271 A1 | 5/2013 | Lee et al. | |
| 2013/0135234 A1 | 5/2013 | Hisano et al. | |
| 2013/0139078 A1 | 5/2013 | Chuang et al. | |
| 2013/0139107 A1 | 5/2013 | Jung | |
| 2013/0141397 A1* | 6/2013 | Dunagan | G06F 3/03545 345/179 |
| 2013/0162532 A1 | 6/2013 | Cheng et al. | |
| 2013/0185680 A1 | 7/2013 | Chaudhri et al. | |
| 2013/0194308 A1 | 8/2013 | Privault et al. | |
| 2013/0229333 A1* | 9/2013 | Schwartz | G06F 1/3231 345/156 |
| 2013/0229389 A1* | 9/2013 | DiVerdi | G06F 3/03545 345/179 |
| 2013/0229390 A1* | 9/2013 | DiVerdi | G06F 3/0488 345/179 |
| 2013/0229391 A1* | 9/2013 | DiVerdi | G06F 3/0488 345/179 |
| 2013/0300719 A1* | 11/2013 | Wang | G06F 3/046 345/179 |
| 2014/0019070 A1* | 1/2014 | Dietz | G06F 3/03545 702/41 |
| 2014/0022218 A1* | 1/2014 | Parekh | G06F 3/038 345/179 |
| 2014/0028635 A1* | 1/2014 | Krah | G06F 3/041 345/179 |
| 2014/0028744 A1* | 1/2014 | Hashi | G09G 3/3406 345/697 |
| 2014/0340341 A1* | 11/2014 | Park | G06F 3/0421 345/173 |
| 2015/0100874 A1* | 4/2015 | Pallakoff | G06F 17/241 715/232 |

OTHER PUBLICATIONS

Volpe, Joseph, Amazon patents intelligent pen for adding annotations to digital and printed media (updated), posted Mar. 6, 2012 at 5:39PM, http://www.engadget.com/2012/03/06/amazon-patents-intelligent-pen/, 3 pages, printed from the Internet on Jun. 20, 2013.

"Apple Secretly Filed Three Dynamic Smart Pen Patents in Europe that are Chock Full of Cool Ideas," http://www.patentlyapple.com/patently-apple/2013/02/apple-secretly-filed-three-dynamic-smart-pen-patents-in-europe-that-are-chock-full-of-cool-ideas.html, originally published Feb. 28, 2013, 13 pages, printed from the Internet on Aug. 13, 2013.

"Bamboo Stylus," Wacom Americas, http://www.wacom.com/en/products/stylus, 5 pages, printed from the Internet on Jun. 20, 2013.

Robertson, Adi, "Blue Tiger pressure-sensitive iOS stylus will work over Bluetooth 4.0," http://www.theverge.com/2012/3/7/2851562/blue-tiger-ten-one-design-pressure-sensitive-bluetooth-4-0-stylus, 1 page, printed from the Internet on Aug. 2, 2013.

Malacria, et al., "Clutch-Free Panning and Integrated Pan-Zoom Control on Touch-Sensitive Surfaces: The CycloStar Approach," CHI 2010, Apr. 10-15, 2010, Atlanta, Georgia, USA. Copyright 2010 ACM 978-1-60558-929-9, 10 pages, Sep. 10, 2004.

"Pen," DuoSense Pen, N-trig Hands-on computing, http://www.n-trig.com/Content.aspx?Page=DigitalPencil, 3 pages, printed from the Internet on Jun. 20, 2013.

"Easing functions," Easing Functions Cheat Sheet, http://easings.net/, 3 pages, printed from the Internet on Jun. 17, 2013.

Kirupa, Easing Functions (aka Timing Functions) in CSS3, printed Apr. 3, 2013, kirupa.com, http://www.kirupa.com/html5/easing_functions_css3.htm, 16 pages, printed from the Internet on Jun. 18, 2013.

"EMR (Electro-Magnetic Resonance) Technology—The De Facto Standard for Pen Tablet Devices is Realized using EMR Technology," Wacom Components : Input Technology : EMR Technology, http://wacom-components.com/english/technology/emr.html, 5 pages, printed from the Internet on Aug. 2, 2013.

(56) References Cited

OTHER PUBLICATIONS

"Simultaneous Pen & Touch: The Natural Way to Work," Perceptive Pixel Active Stylus, www.perceptivepixel.com/_literature_136086/Active_Stylus, 2 pages, printed from the Internet on Dec. 14, 2012.

"Future Apple Notebooks & Tablets may use Acoustic Commands—Patently Apple," originally published Feb. 18, 2011, http://www.patentlyapple.com/patently-apple/2011/02/future-apple-notebooks-tablets-may,6 pages, printed from the Internet on Nov. 3, 2012.

"Guidelines for selecting text and images (Windows Store apps)," http://msdn.microsoft.com/en-us/library/windows/apps/hh465334, 5 pages, printed from the Internet on Jun. 20, 2013.

Lutz, Zachary, "Hands-on with wireless, ultrasonic stylus an touchless gestures at MWC (video)," posted Mar. 1, 2012 at 8:28 AM, http://www.engadget.com/2012/03/01/hands-on-with-wireless-ultrasonic-stylus-and-touchl, 3 pages, printed from the Internet on Jun. 20, 2013.

"HEX3 JaJa Pressure Sensitive Stylus," HEX3 JaJa Pressure Sensitive Stylus Review & Rating—PCMag.com, http://www.pcmag.com/article2/0,2817,2411194,00.asp, 6 pages, printed from the Internet on Jun. 20, 2013.

"How do WACOM tablets work?," tablet4u.co.uk, http://www.tablet4u.co.uk/techinfo.html, 2 pages, printed from the Internet on Jun. 20, 2013.

Kim, Arnold, "Multi-Touch Page Flipping eBook Concept Shown on an iPad," posted Jan. 22, 2012 at 10:52pm PST, MacRumors—news and rumors you care about, http://www.macrumors.com/2012/01/23/multi-touch-page-flipping-ebook-concept-shown-6 pages, printed from the Internet on Nov. 3, 2012.

"Desktop Touchscreens,"—Desktop touchscreens explained, http://www.touchscreenmagazine.nl/touchscreen-solutions/desktop-touchscreens, 1 page, printed from the Internet on Nov. 3, 2012.

"MTStylus Wireless Stereo Stylus for iPhone/Andriod Phone & Tablet," dexim-MTStylus Wireless Stereo Stylus, http://www.dexim.net/content.php?id=165&pid=11, 2 pages, printed from the Internet on Jun. 20, 2013.

"Padblue 2," BRANDO—mobile.brando.com, http://mobile.brando.com/Padblue-2_p9162c1577d94.html., 4 pages, printed from the Internet on May 10, 2013.

Fingas, Jon, "Panasonic mobile devices to use Anoto's pattern-based pen input technology," posted Jan. 8, 2013 at 1:00PM, http://www.engadget.com/2013/01/08/panasonic-mobile-devices-to-use-anoto-pattern-pen-, 4 pages, printed from the Internet on Jun. 20, 2013.

"Bluetooth 4.0 SmartPen the future just got a little brighter," Pogo Connect, http://tenonedesign.com/connect.php, 7 pages, printed from the Internet on Jun. 20, 2013.

Quick, Darren, "Pressure sensitive technology set to bring 3D capability to touchscreens," posted on Jan. 31, 2010, Mobile Technology, http://www.gizmag.com/new-touchscreen-technology, 4 pages, printed from the Internet on Aug. 2, 2013.

Rigg, Jamie, "Sony tries to patent stylus with friction-based haptic feedback," posted on Nov. 22, 2012 at 9:50 AM, http://www.engadget.com/2012/11/22/sony-haptic-feedback-stylus-patent/, 2 pages, printed from the Internet on Jun. 20, 2013.

"Stylus Hanging Bluetooth Headset," BRANDO—mobile.brando.com, http://mobile.brando.com/prod_detail.php?prod_id=03291, 4 pages, printed from the Internet on May 10, 2013.

"The JukeStyle is a great budget stylus for your iOS devices," stylus Archives—iPad News, http://www.ipadnews.nl/tag/stylus/, 44 pages, printed from the Internet on Jun. 20, 2013.

Lavrinc, Damon, "Why Flipping Through Paper-Like Pages Endures in the Digital World," originally posted on May 11, 2012 at 3:48PM, Gadget Lab, http://www.wired.com/gadgetlab/2012/05/why-flipping-through-paper-like-pages-endures-in-the-digital-world/, 5 pages, printed from the Internet on May 6, 2013.

Bragdon, et al., "Experimental Analysis of Touch-Screen Gesture Designs in Mobile Environments", Proceedings of the SIGCHI Conference on Human Factors in Computing Systems, pp. 403-412 (2011).

"Gesture Search for Google Mobile", Google Mobile, www.google.com/mobile/gesture-search, 1 page, printed from the Internet on Dec. 26, 2012.

"Comics by comiXology," Comic Book Reader Guide, http://www.comicbookreaderguide.com/comics-by-comixology/, 24 pages, printed from the Internet on May 6, 2013.

"NFC Forum: Frequently Asked Questions," http://www.nfc-forum.org/resources/faqs#acknowledge, 11 pages, printed from the Internet on Feb. 18, 2013.

"How to Remote Wipe an iPhone or iPad," OSXDaily, http://osxdaily.com/2012/06/05/remote-wipe-iphone-or-ipad/, 4 pages, printed from the Internet on Feb. 2, 2013.

"Screen hotspot," Wikipedia, the free encyclopedia, http://en.wikipedia.org/wiki/Screen_hotspot, 1 page, printed from the Internet on May 15, 2013.

"PAiA-Touch Switches," PAiA Corporation USA, file:///S:/Client%20Files/Barnes%20&%20Noble/IDS%20Master%20Folder/S&G%20-%2 . . . , 3 pages, printed from the Internet on Aug. 27, 2013.

Kanai, et al., "Intra-Rendition Navigation," Copyright 2012-2013 International Digital Publishing Forum (IDPF), 13 pages.

"Explaining how the sPen tech works (and is very diff than other styluses)," http://forum.xda-developers.com/showthread.php?t=, 1 page, printed from the Internet on Jan. 15, 2013.

\* cited by examiner

STYLUS SENSITIVE DEVICE WITH STYLUS ANGLE DETECTION FUNCTIONALITY

FIELD OF THE DISCLOSURE

This disclosure relates to electronic display devices, and more particularly, to user interface techniques for interacting with stylus sensitive computing devices.

BACKGROUND

Electronic display devices such as tablets, eReaders, mobile phones, smart phones, personal digital assistants (PDAs), and other such stylus sensitive electronic display devices are commonly used for displaying consumable content. The content may be, for example, an eBook, an online article or blog, images, documents, a movie or video, just to name a few types. Such display devices are also useful for displaying a user interface that allows a user to interact with files or other content on the device. The user interface may include, for example, one or more screen controls and/or one or more displayed labels that correspond to nearby hardware buttons. The user may interact with the touch/stylus sensitive device using fingers, a stylus, or other implement. The display may be backlit or not, and may be implemented for instance with an LCD screen or an electrophoretic display. Such devices may also include other contact sensitive surfaces, such as a track pad (e.g., capacitive or resistive sensor) or contact sensitive housing (e.g., acoustic sensor).

DETAILED DESCRIPTION

Figure 1A:
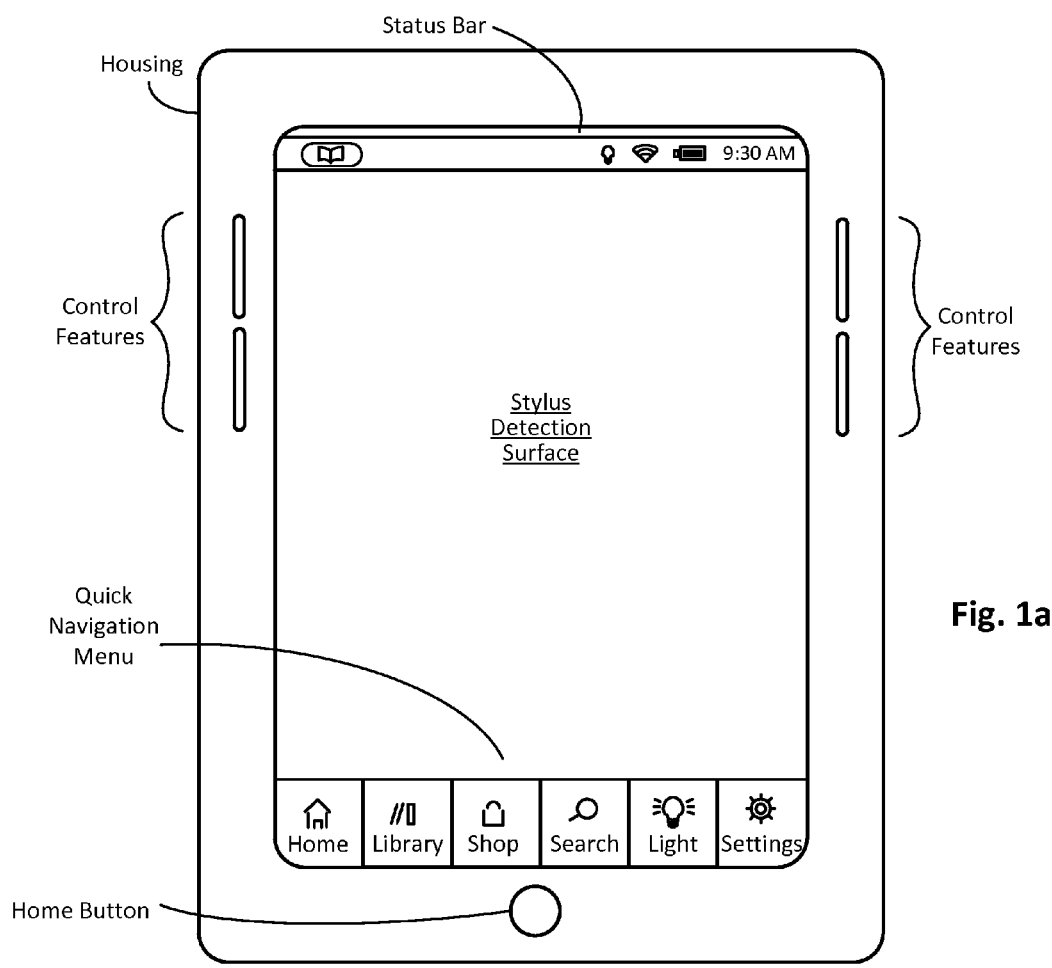
FIGS. 1a-b illustrate an example electronic computing device with a stylus detection surface, configured in accordance with an embodiment of the present invention.

Techniques are disclosed for performing functions in electronic devices by changing the angle between a stylus and a stylus detection surface of an electronic device. Changing the angle of inclination of a stylus may include placing the stylus tip above a stylus detection surface, either in direct contact or otherwise sufficiently proximate indirect contact, and changing the angle between the stylus and the stylus detection surface. In some cases a stylus angle change gesture may include one angle change or a combination of angle changes. In other cases a stylus angle change gesture may be accompanied with the user holding down one or more stylus control features. Each uniquely identifiable angle change or combination of angle changes may be associated with a distinct device or stylus function. The device may detect whether the stylus is pointing to specific content on the device at the beginning of a gesture and the stylus angle change gesture may perform functions on selected content or on one or more UI control features or icons on the device. In other cases, functions can be performed without reference to specific content. The device may track stylus location over the detection surface and the stylus gestures may be location sensitive. The various functions assigned to stylus angle change gestures may be user-configurable and/or hard-coded, and may be performed on an application-specific level, a content-specific level, or a global device level. An animation can be displayed as the stylus gestures are executed.

General Overview

As previously explained, electronic display devices such as tablets, eReaders, and smart phones are commonly used for displaying user interfaces and consumable content. In typical operation, the user might desire to, for example, navigate through pages of a book or other content, adjust font size, zoom in or out, scroll through a list, fast forward through a video, change screen settings, or otherwise interact with a given electronic device. While most electronic devices typically provide a series of actions for performing these various tasks, there does not appear to be an intuitive stylus angle-based user interface function for performing such tasks.

Thus, and in accordance with an embodiment of the present invention, stylus-based techniques are provided for performing functions in electronic devices by manipulating the angle of inclination of a stylus over a stylus detection surface. A stylus angle change gesture or a combination of stylus angle changes, may be associated with a function such as adjusting volume, adjusting screen brightness, adjusting font size, scrubbing or navigating content faster or slower, scrolling through a textbook or through notes (e.g., such as notes taken during an educational lecture, or a calendar reminder, etc), adjusting audio/video playback speed, etc. As used herein, scrubbing content using stylus angle change gestures refers to changing the acceleration of navigation through content based on the steepness of the angle at which the stylus is tilted above a stylus detection surface. For example, in some instances a user may employ the angle detection mode provided herein to scrub/navigate through a book or document, wherein a so-called home or rest position is at about 90 degrees (+/−5 degrees), a first angle (e.g., between 85 and 70 degrees) causes navigation to occur one page at a time, as second angle (e.g., between 70 and 45 degrees) causes navigation to occur ten pages at a time, and a third angle (e.g., between 45 and 0 degrees) causes navigation to occur one chapter at a time. As will be appreciated in light of this disclosure, these same principles can be readily applied to all types of content and media (not just pages in a book or document). A slight angle change may perform a first device function, while a steeper or more extreme stylus angle change may perform another device function or accelerate the first function. In such an example, the angle of inclination of the stylus may act as a throttle, effectively regulating the speed of a device or stylus function. In a more general sense, any uniquely identifiable stylus angle change or combination of angle changes may be configured to perform a stylus or device function. In some embodiments, the stylus may be pointing to a specific selection of content, a UI control feature or icon, or a specific area of a stylus sensitive display. In such an example, the stylus angle detection mode may be used to perform an operation on the selected content, open the selected file or application, manipulate the UI control feature, etc. In one specific such example, a stylus angle change gesture may be associated with a different function depending on the area of the screen over which the stylus is located. In other embodiments, the stylus angle change gesture may be configured to perform a certain function regardless of whether content is selected, where the stylus is located over the device, or where the stylus is pointing. In some such selection-free embodiments, the stylus angle change gesture may perform a certain function based on a currently running application, or a specific stylus angle change gesture may be globally associated with a specific device function. Numerous selection-free stylus angle change gestures and functions will be apparent in light of this disclosure, and may be user-configurable or hard-coded.

In some embodiments, the stylus angle detection mode may be combined with or otherwise preceded by a content selection action (e.g., a single item selection, a select-and-drag action, a book-end selection where content between two end points is selected, or any other available content selection technique). As will be appreciated, the stylus may be used to make the content selection, but it need not be, rather, content may be selected using any means. In one example embodiment, the user may select a section of text, and then increase the font size of the selected text (or perform another function assigned to a stylus angle detection mode), by inclining the stylus to the right. In a more general sense, the stylus may be used to perform functions on content that was pre-selected with or without the stylus, or to simultaneously select and perform functions on target content. The degree to which the selection and other functions overlap may vary depending on factors such as the type of content and the processing capability of the stylus and/or related device.

In some example embodiments, the stylus angle detection mode may be accompanied with animation and/or sound effects to further enhance the user interface experience. For example, a page turning animation might show a page leaf flipping over if the stylus angle change gesture is being used to turn the page of an eBook. In a similar fashion, a volume increase animation might show a speaker with an increasing number of sound waves coming from it if the stylus angle change gesture is being used to increase volume. The various sound effects or animations may be customizable by the user in some embodiments. A combination of animation and sound or other suitable notifications can be used as well, as will be appreciated in light of this disclosure.

The techniques have a number of advantages, as will be appreciated in light of this disclosure. For instance, in some cases, the techniques can be employed to provide a discreet and intuitive way for a user to interact with a device without overly distracting the user (or others nearby) from other events occurring during the interaction. For instance, in some such embodiments, a student attending a lecture (either live or via a network) can perform various tasks such as adjusting device screen settings or scrolling rapidly through slides or other classroom materials via stylus angle change gestures. In such cases, for instance, the student can hold the stylus over the stylus sensitive surface and readily activate and/or navigate tools that can supplement the educational experience with angle adjustments of the stylus. In one particular example embodiment, a student can navigate through notes, slides, or other classroom materials by manipulating the stylus' angle of inclination. In one such embodiment, inclining the stylus from side to side can accelerate through pages of a slideshow or textbook, while inclining the stylus forward and back can switch between viewing notes, a slideshow, or a textbook. In another example embodiment, inclining the stylus angle slightly to the right can begin a slideshow; while a steeper angle change may accelerate the slideshow speed or perform a different action, such as begin recording a lecture.

Numerous uniquely identifiable engagement and notification schemes that exploit a stylus and a stylus detection surface to effect desired functions by detecting the angle changes between a stylus and a detection surface can be used, as will be appreciated in light of this disclosure. Further note that any suitable stylus detection surface (e.g., track pad, touch screen, electro-magnetic resonance (EMR) sensor grid, or other stylus sensitive surface, whether capacitive, resistive, acoustic, or other stylus detecting technology) may be used to detect the angle changes between the stylus and device, and the claimed invention is not intended to be limited to any particular type of stylus detection technology, unless expressly stated.

Architecture

Figure 1B:
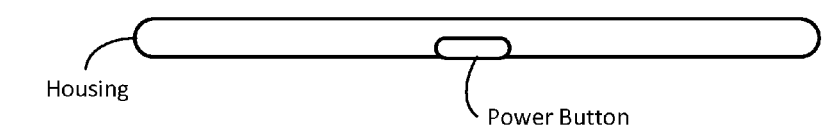

FIGS. 1a-b illustrate an example electronic computing device with a stylus detection surface configured with a stylus angle detection mode, in accordance with an embodiment of the present invention. As can be seen, in this example embodiment, the stylus detection surface is a touch screen surface. The device could be, for example, a tablet such as the NOOK, tablet or eReader by Barnes & Noble. In a more general sense, the device may be any electronic device having a stylus detection user interface and capability for displaying content to a user, such as a mobile phone or mobile computing device such as a laptop, a desktop computing system, a television, a smart display screen, or any other device having a stylus detection display or a non-sensitive display screen that can be used in conjunction with a stylus detection surface. As will be appreciated, the claimed invention is not intended to be limited to any particular kind or type of electronic device.

As can be seen with this example configuration, the device comprises a housing that includes a number of hardware features such as a power button, control features, and a press-button (sometimes called a home button herein). A user interface is also provided, which in this example embodiment includes a quick navigation menu having six main categories to choose from (Home, Library, Shop, Search, Light, and Settings) and a status bar that includes a number of icons (a night-light icon, a wireless network icon, and a book icon), a battery indicator, and a clock. Other embodiments may have fewer or additional such user interface (UI) features, or different UI features altogether, depending on the target application of the device. Any such general UI controls and features can be implemented using any suitable conventional or custom technology, as will be appreciated.

The hardware control features provided on the device housing in this example embodiment are configured as elongated press-bars and can be used, for example, to page forward (using the top press-bar) or to page backward (using the bottom press-bar), such as might be useful in an eReader application. The power button can be used to turn the device on and off, and may be used in conjunction with a touch-based UI control feature that allows the user to confirm a given power transition action request (e.g., such as a slide bar or tap point graphic to turn power off). Numerous variations will be apparent, and the claimed invention is not intended to be limited to any particular set of hardware buttons or features, or device form factor.

In this example configuration, the home button is a physical press-button that can be used as follows: when the device is awake and in use, tapping the button will display the quick navigation menu, which is a toolbar that provides quick access to various features of the device. The home button may also be configured to cease an active function that is currently executing on the device, or close a configuration sub-menu that is currently open. The button may further control other functionality if, for example, the user presses and holds the home button. For instance, an example such push-and-hold function could engage a power conservation routine where the device is put to sleep or an otherwise lower power consumption mode. So, a user could grab the device by the button, press and keep holding as the device is stowed into a bag or purse. Thus, one physical gesture may safely put the device to sleep. In such an example embodiment, the home button may be associated with and control different and unrelated actions: 1) show the quick navigation menu; 2) exit a configuration sub-menu; and 3) put the device to sleep. As can be further seen, the status bar may also include a book icon (upper left corner). In some cases, selecting the book icon may provide bibliographic information on the content or provide the main menu or table of contents for the book, movie, playlist, or other content.

Figure 1C:
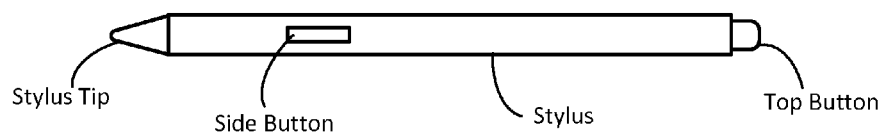
FIG. 1c illustrates an example stylus for use with an electronic computing device, configured in accordance with an embodiment of the present invention.

FIG. 1c illustrates an example stylus for use with an electronic computing device configured in accordance with an embodiment of the present invention. As can be seen, in this particular configuration, the stylus comprises a stylus tip used to interact with the stylus detection surface (by either direct contact or hover over interaction, or otherwise sufficiently proximate indirect contact) and control features including a top button and a side button along the shaft of the stylus. In this example, the stylus tip has a rounded triangular shape, while in alternative embodiments the stylus tip may be more rounded, or any other suitable shape. The stylus tip may be made of any number of materials of different textures and firmness depending on the needs of the specific device. The stylus may include fewer or additional control features than the top and side buttons illustrated in FIG. 1c, or different control features altogether. Such control features may include, for example, a rotating knob, a switch, a sliding control bar, or other suitable control features that will be apparent in light of this disclosure. The stylus may be an active or passive stylus, or any other suitable implement for interacting with the device and carrying out the stylus angle detection mode described herein. As will be appreciated, the claimed invention is not intended to be limited to any particular kind or type of stylus.

Figure 1D:
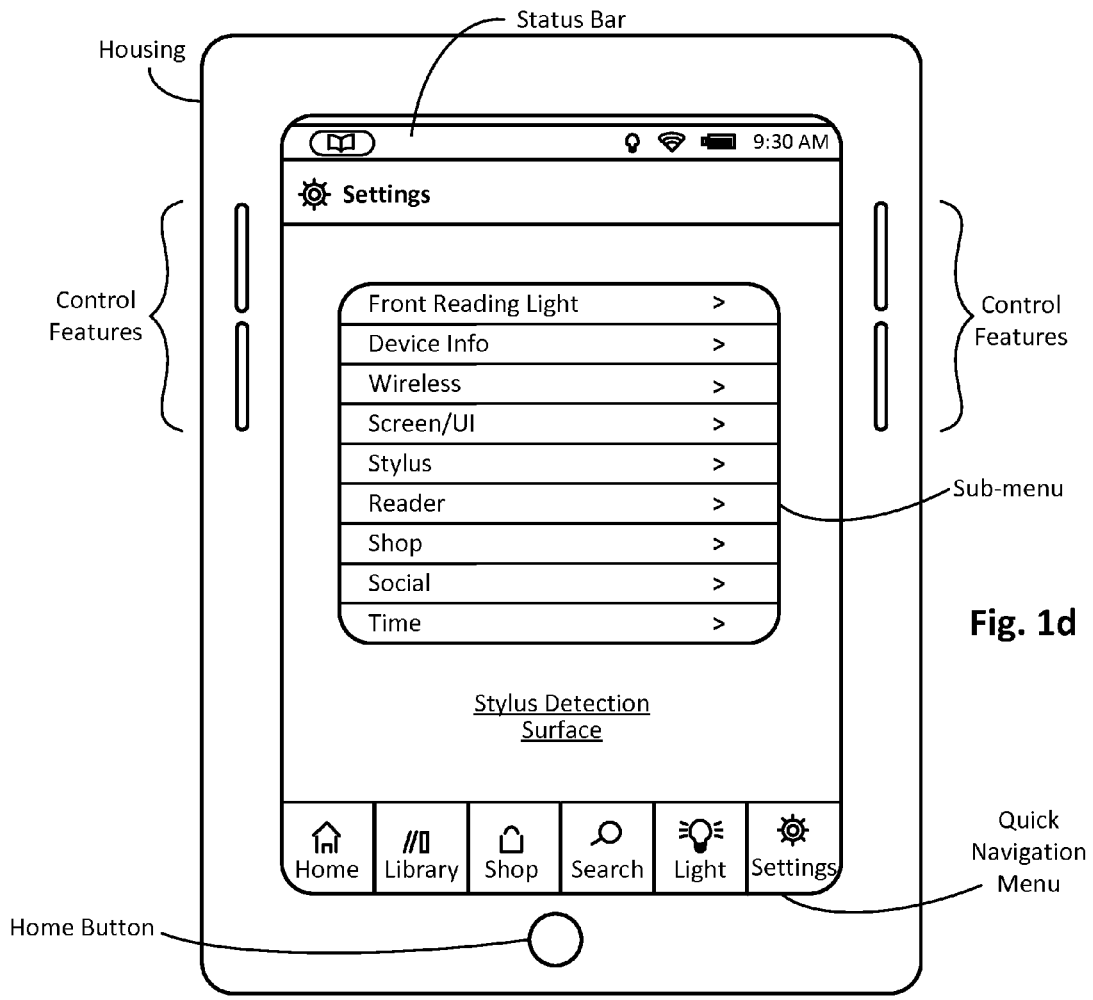
FIGS. 1d-e illustrate example configuration screen shots of the user interface of the electronic device shown in FIGS. 1a-b, configured in accordance with an embodiment of the present invention.
Figure 1E:
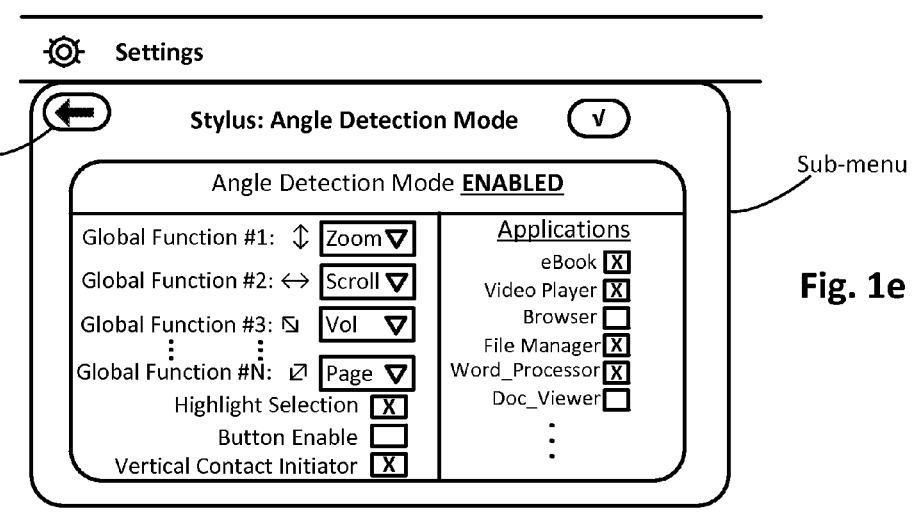

In one particular embodiment, a stylus angle detection configuration sub-menu, such as the one shown in FIG. 1e, may be accessed by selecting the Settings option in the quick navigation menu, which causes the device to display the general sub-menu shown in FIG. 1d. From this general sub-menu, the user can select any one of a number of options, including one designated Stylus in this specific example case. Selecting this sub-menu item may cause the configuration sub-menu of FIG. 1e to be displayed, in accordance with an embodiment. In other example embodiments, selecting the Stylus option may present the user with a number of additional sub-options, one of which may include a so-called "stylus angle detection mode" option, which may then be selected by the user so as to cause the stylus angle detection configuration sub-menu of FIG. 1e to be displayed. Any number of such menu schemes and nested hierarchies can be used, as will be appreciated in light of this disclosure. In other embodiments, the stylus angle detection function is hard-coded such that no configuration sub-menus are needed or otherwise provided (e.g., inclining stylus over the device for carrying out actions as described herein, with no user configuration needed). The degree of hard-coding versus user-configurability can vary from one embodiment to the next, and the claimed invention is not intended to be limited to any particular configuration scheme of any kind, as will be appreciated.

As will be appreciated, the various UI control features and sub-menus displayed to the user are implemented as touch screen controls in this example embodiment. Such UI screen controls can be programmed or otherwise configured using any number of conventional or custom technologies. In general, the touch screen display translates touch or a specific stylus angle change in a given location into an electrical signal which is then received and processed by the device's underlying operating system (OS) and circuitry (processor, etc). Additional example details of the underlying OS and circuitry in accordance with some embodiments will be discussed in turn with reference to FIG. 2a.

The stylus detection surface (or stylus detection display, in this example case) can be any surface that is configured with stylus detecting technologies capable of sensing the angle between a stylus and the display surface (or changes in that angle, as the case may be), whether capacitive, resistive, acoustic, active-stylus, and/or other input detecting technology. In some embodiments, the screen display can be layered above input sensors, such as a capacitive sensor grid for passive touch-based input, such as with a finger or passive stylus in the case of a so-called in-plane switching (IPS) panel, or an electro-magnetic resonance (EMR) sensor grid (e.g., for sensing a resonant circuit of the stylus). In some embodiments, the stylus detection display can be configured with a purely capacitive sensor, while in other embodiments the touch screen display may be configured to provide a hybrid mode that allows for both capacitive input and EMR input, for example. In still other embodiments, the stylus detection surface is configured with only an active stylus sensor. Numerous touch screen display configurations can be implemented using any number of known or proprietary screen based input detecting technologies. In any such embodiments, a stylus detection surface controller may be configured to selectively scan the stylus detection surface and/or selectively report stylus angle measurements (or detection inputs from which stylus angle and angle changes can be determined).

In one example embodiment, a stylus angle input can be provided by placing the stylus tip on the stylus detection surface, or sufficiently close to the surface (e.g., hovering one to a few centimeters above the surface, or even farther, depending on the sensing technology deployed in the stylus detection surface) but nonetheless triggering a response at the device just as if direct contact were provided directly on a touch screen display. Once the device has detected the presence of the stylus, the device may calculate the angle between the stylus and the surface of the device. As will be appreciated in light of this disclosure, a stylus as used herein may be implemented with any number of passive and/or active stylus technologies, such as a DuoSense® pen by N-trig® (e.g., wherein the stylus utilizes a touch sensor grid of a touch screen display) or EMR-based pens by Wacom technology, or any other commercially available or proprietary stylus technology. Further recall that the stylus sensor in the computing device may be distinct from an also provisioned touch sensor grid in the computing device. Having the touch sensor grid separate from the stylus sensor grid allows the device to, for example, only scan for a stylus input, a touch contact, or to scan specific areas for specific input sources, in accordance with some embodiments. In one such embodiment, the stylus sensor grid includes a network of antenna coils that create a magnetic field which powers a resonant circuit within the stylus. In such an example, the stylus may be powered by energy from the antenna coils in the device and the stylus may return the magnetic signal back to the device, thus communicating the stylus' location above the device, angle of inclination, speed of movement, etc. Such an embodiment also eliminates the need for a battery on the stylus because the stylus is powered by the antenna coils of the device. In one particular example, the stylus sensor grid includes more than one set of antenna coils. In such an example, one set of antenna coils may be used to merely detect the presence of a stylus contact or a hovering or otherwise sufficiently proximate stylus, while another set of coils determines with more precision the stylus' location above the device and the stylus' angle of inclination.

In some embodiments, the target function may be performed regardless of where the stylus is located above the stylus sensitive display; however, the stylus angle detection mode may be location sensitive. In one specific example, a stylus angle change above one area of the screen (the bottom right area, for example) may result in an increase in the font size while the same stylus angle change above another area of the screen (the bottom left, for example) may result in an increase in volume. As discussed above, such functions may be hard-coded or user-configurable.

As previously explained, and with further reference to FIGS. 1d and 1e, once the Settings sub-menu is displayed (FIG. 1d), the user can then select the Stylus option. In response to such a selection, the stylus angle detection configuration sub-menu shown in FIG. 1e can be provided to the user. The user can configure a number of functions with respect to the stylus angle detection mode, in this example embodiment. For instance, in this example case, the configuration sub-menu includes a UI check box that when checked or otherwise selected by the user, effectively enables the stylus angle detection mode (shown in the enabled state); unchecking the box disables the mode. Other embodiments may have the stylus angle detection mode always enabled, or enabled by a physical switch or button located on either the device or the stylus, for example. Examples of possible functions that can be controlled based on stylus angle include, for instance, scrubbing or navigating through content at a faster or slower rate, scrolling through content, interacting with a program or game on a device, zooming in or out, adjusting font size, adjusting brightness, adjusting volume, skipping scene, adjusting video/audio playback speed, and other such rate-adjustable functions. The stylus angle detection mode may be configured to perform a different function or an accelerated function (e.g. increasing the fast-forward speed in a video player application) depending on the angle of inclination of the stylus. Stylus angle detection functions may be configured on a content-specific level, an application-specific level, or on a global level wherein the gesture performs the same function regardless of the application running or type of content currently displayed at the time, and regardless of whether content is selected.

With further reference to the example embodiment of FIG. 1e, the user may assign a number of global functions depending on the stylus angle and orientation to the stylus angle detection mode. In one example embodiment, the stylus angle change gestures and functions may be configured using various function pull-down menus. In this particular example, an up/down stylus angle action is assigned to a zoom function, a left/right stylus angle action is assigned to a scroll function, a first diagonal (top-left to bottom-right) stylus angle action is assigned to a volume function, and a second diagonal (top-right to bottom-left) stylus angle action is assigned to a paging function. In any such cases, angling the stylus in one direction along the given axis (e.g., top/bottom, right/left, diagonal) may cause an increase in a parameter value (e.g., louder volume or higher zoom factor) or a forward movement (e.g., paging forward or scrolling down), and angling the stylus in the opposite direction along that given axis may cause a decrease in the parameter value (e.g., softer volume or lower zoom factor) or a backward movement (e.g., paging backward or scrolling up). The steepness of the angle in any one direction may be used to accelerate the action (e.g., rapid volume decrease or zoom-in, faster page turning or scrolling).

As can be further seen with reference to the example embodiment of FIG. 1e, the user may also determine how the stylus angle detection mode will be enabled. Triggering a stylus angle change function whenever the stylus is in contact (direct or proximal) with the stylus detection surface may be undesirable, and in some instances the user may wish to only perform stylus angle change gestures at certain times. In this particular embodiment, the user has the option of enabling the stylus angle detection mode with a button (Button Enable check box), such that stylus angle change functions will only be performed when a stylus button or control feature (such as the side or top buttons of the example stylus shown in FIG. 1c) is activated in conjunction with the angling motion of the stylus. In other embodiments, an initial stylus gesture may be used to enable the stylus angle detection mode. In one such case, for instance, performing an initial substantially vertical tap or contact with the stylus on the stylus detection surface (where the stylus is perpendicular to the plane of the stylus detection surface), followed by the desired angle change can be used to carry out stylus angle based control as described herein. As shown in the example embodiment of FIG. 1e, the user has selected the vertical contact option (Vertical Contact Initiator check box) and the angle detection mode will only be enabled after an initial vertical stylus contact. In one such embodiment, the initiating gestures are performed with the stylus tip, while in other embodiments the other end of the stylus may be used, or any other suitable part of a stylus or other implement that can be uniquely detected as a stylus angle mode initiation gesture. In some embodiments, a unique combination of stylus control feature input and/or stylus placement can be used in conjunction with angle changing to effect various functions. For instance, the example stylus shown in FIG. 1c includes a top button and a side button, the user may be able to associate a function with gestures accompanied by each of the buttons. In such an example, an angle change with the top button pressed may be configured to increase volume, an angle change with the side button pressed may be configured to increase screen brightness, and an angle change with no button pressed may be configured to scroll or page depending on active application (e.g., scrolling if browser is open, paging in eReader is open).

In some embodiments the user may also enable a highlight selection option, which may highlight content when the stylus is pointing toward that content or when that content has been selected by the user. In other embodiments, targeted or preselected content may be highlighted in order to notify the user that certain content will be affected by a stylus angle change. In the particular embodiment shown in FIG. 1e, a highlight mode (Highlight Section check box) is enabled and the UI icon, UI control feature, or selection of text or other content upon which the stylus angle change function will be performed is highlighted. As used here, highlighting may refer, for example, to any visual and/or aural indication of a content selection, which may or may not include a formatting change. In one particular embodiment, the stylus angle change gesture may be associated with increasing the font size of content and the highlighting function may outline or color a particular section of text that the stylus is pointing toward, thus indicating that a stylus angle change at that moment will adjust the font size of the highlighted text. In another particular embodiment, the stylus angle change gesture may be associated with increasing the volume and the highlighting function may amplify the UI volume control feature that the stylus is pointing toward (so that the UI volume control feature is visually bigger than the other currently displayed UI control features, or otherwise accentuated), thus indicating that a stylus angle change at that moment will adjust the volume. Numerous other such selection-based content and UI feature control scenarios will be apparent in light of this disclosure. Note, however, that other stylus-based control schemes that leverage the stylus angle detection mode may be carried out without any selection necessary (generally referred to herein as selection-free control). For instance, global functions assigned to stylus angle gestures can be executed in a selection-free manner.

With further reference to the example embodiment of FIG. 1e, the user may also specify a number of applications in which the stylus angle detection mode can be invoked. Such a configuration feature may be helpful, for instance, in a tablet or laptop or other multifunction computing device that can execute different applications (as opposed to a device that is more or less dedicated to a particular application). In this example case, the available applications are provided along with a corresponding check box, but could be pull-down menus or some other suitable UI feature. Note the diverse nature of the example applications, including an eBook application, a video player application, a browser application, a file manager application, a word processor application, a document viewer application, which are just a few examples. In the example shown in FIG. 1e, the stylus angle detection mode is not enabled with browser or document viewer applications. In some cases the user may be able to customize gestures and functions within each application (e.g., in eBook application, first stylus angle is single page turn, second stylus angle is 10-page turn, and third stylus angle is chapter advance; in browser application, up/down stylus angle scrolls up/down and left/right stylus angle zooms-in/out; in note taking application, left/right stylus angle scrolls left/right through existing note pages or creates the next new note page, and up/down stylus angle saves note content to stylus (up angle) and/or cloud (down angle). In other embodiments, the angle detection mode can be invoked whenever the stylus is activated, regardless of the application being used (e.g., global functions). A hybrid of global functions and application-specific functions can be used as well, as will be appreciated in light of this disclosure. Any number of applications or device functions may benefit from a stylus-based angle detection mode as provided herein, whether user-configurable or not, and the claimed invention is not intended to be limited to any particular application or set of applications. In other user-configurable embodiments, the user may be able to access a configuration sub-menu that allows the user to associate functions with specific stylus angle ranges. In some such embodiments, the angle ranges may be configured by the user, and the various functions may be configured on a global or application-specific level. In still other embodiments, various angle-specific functions, application-specific functions, and/or global functions can be hard-coded. Various example stylus angle ranges, along with application-specific device functions associated with those angle ranges, are shown below in Tables 1 and 2, which will be discussed in turn.

In this particular example embodiment, the stylus sensitive display is a flat surface which may be assigned x-y coordinates wherein the x-axis generally runs from left to right across the content being displayed on the device and the y-axis generally runs from top to bottom across the content being displayed on the device. In some embodiments, the content displayed on the screen may change orientation with respect to the device frame or housing (e.g., when the user rotates the device to view content in either portrait or landscape mode), and as such the x-y coordinates discussed herein can be determined based on the content being displayed, rather than the physical frame of the device. In one example embodiment, the angles can be measured with respect to the z-axis, wherein the z-axis extends away from the device normal to the x-y plane, with the resulting x-y quadrant indicative of the change effected. In one such case, any angle having a positive x-coordinate can be used to provide an increase or forward motion (depending on the target function) and any angle having a negative x-coordinate can be used to provide a decrease or backward motion. Likewise, in another example embodiment, any angle having a positive y-coordinate can be used to provide an increase or forward motion (depending on the target function) and any angle having a negative y-coordinate can be used to provide a decrease or backward motion. Still in other embodiments, the x-y grid can be broken into four distinct quadrants (instead of two), with stylus angles into any one quadrant corresponding to a given function/action.

In the specific examples described in Table 1, note that the angle is referenced to the positive x-axis, so there are effectively two quadrants: positive x (covering from 0 to 90 degrees) and negative x (covering from 90 to 180 degrees). As can be seen in this particular example case, a home or rest position is provided for in the range of 90 degrees+/−5 degrees (about normal to the stylus detection surface) where no angle-based action will be taken. A slight angle change with the stylus between 85°-70° will cause an eBook application to progress through an eBook at one page per second, or a one page advance if the stylus is quickly returned to the home position (much like a flick gesture which involves a quick angle change of the stylus, followed by a return to home position). As can be further seen with reference to Table 1, a similar angle change can be used to increase audio/video playback to 2× normal speed in an audio/video player application, and to scroll down through content at a rate of two lines per second in a browser application. Continuing with the particular examples of Table 1, an increased angle change between 70°-40° will accelerate the previous example functions, causing an eBook application to progress at a rate of five pages per second, an audio/video playback application to increase playback speed to 10× normal, and a browsing application to increase scrolling rate to 10 lines per second. A more severe angle change between 40°-0°, in this particular example, will further accelerate the previous functions. The eBook application will progress at 20 pages per second (or a chapter jump every two seconds), the audio/video application will increase speed to 40× normal (or a chapter/section jump every two seconds), and the browser-based scrolling function will bring the user to the end of the list or content being scrolled through. In a similar way, angles between 95°-180° (with respect to the positive x-axis) may be segmented and assigned to application-specific functions as shown in Table 1. Thus, an eBook application may flip backward through the book being displayed at various rates depending on the angle of inclination, an audio/video player may rewind through content at various rates or may begin playing back content in slow-motion depending on the angle of inclination, and a browser application may scroll up through content or jump to the top of a page or list depending on the angle of inclination.

TABLE 1

| Stylus Angle (+x-axis) | Rate of page turning (eBook application) | Playback speed (Video/audio app) | Scroll speed (Browser application) |
| --- | --- | --- | --- |
| 95°-85° | Home/Rest | Home/Rest | Home/Rest |
| 85°-70° | 1 page/sec. forward | Forward 2x | Down 2 lines/sec. |
| 70°-40° | 5 pages/sec. forward | Forward 10x | Down 10 lines/sec. |
| 40°-0° | 20 pages/sec. forward | Forward 40x | End of content or list |
| 95°-115° | 1 page/sec. back | Back 2x | Up 2 lines/sec. |
| 115°-140° | 5 pages/sec. back | Back 10x | Up 10 lines/sec. |
| 140°-180° | 20 pages/sec. back | Back 40x | Top of content or list |

In the specific example embodiments described in Table 2, a slight angle change with the stylus between 85°-70° will cause an eBook application to scroll through text of the eBook at a rate of one word per second, selecting one word at a time in the progression. A similar angle change in a browser application will scroll down through content on a sentence-by-sentence basis, in this particular example. In some such cases, note that the word or sentence may be highlighted if so desired, so as to give the user a visual cue as to the progression. An increased angle change between 70°-40° in this example case accelerates the previous function, causing the eBook application to scroll through text at a rate of two words per second, and the browser application to scroll down through content at a rate of two sentences per second. A more severe stylus angle change between 40°-0° in an eBook application may perform a different function altogether, such as look-up definition (dictionary) function for a selected word. A similar severe stylus angle change in a browser application may, for instance, open a new tab or select a hyperlink that is being pointed to or otherwise selected, in this particular example. Similarly, and with respect to an eReader application, stylus angle changes between 95°-140° may scroll up through an eBook application at various rates, and angle changes between 140°-180° may launch a note taking application (e.g., so a student can take notes on the content being consumed). Likewise, in a browser application, various stylus angle changes between 95°-140° may scroll up through the content at various rates, and a severe angle change between 140°-180° may, for example, login the user to a test server (e.g., so a student can take the examination on the material just consumed). Numerous other such stylus angle based functions that allow for seamless interaction with a computing device or cloud-based service will be apparent in light of this disclosure.

TABLE 2

| Stylus Angle | eBook Application Function | Browser Application Function |
| --- | --- | --- |
| 85°-70° | Scroll down text 1 word/sec. | Scroll down/highlight 1 sentence/sec. |
| 70°-40° | Scroll down text 2 words/sec. | Scroll down/highlight 2 sentence/sec. |
| 40°-0° | Look up selected word | Select hyperlink |
| 95°-115° | Scroll up text 1 word/sec. | Scroll up/highlight 1 sentence/sec. |
| 105°-140° | Scroll up text 2 words/sec. | Scroll up/highlight 2 sentence/sec. |
| 140°-180° | Launch note taking application | Log-in to Test Server |

The examples provided in Tables 1-2 are directed to angle movements along the x-z plane; however angle movements in the y-z plane or both the x-z and y-z planes may also be calculated and associated with device or stylus functions in some embodiments. Using both the x-z and y-z planes may allow for three dimensional detection schemes, such as may be used in gaming applications, or to provide a greater number of unique stylus angle/function pairs. The examples provided in Tables 1-2 are for illustrative purposes only, and many other applications, angle ranges, and device/stylus functions will be apparent in light of this disclosure. As will be further appreciated, the angle ranges and functions described in Tables 1-2, along with other ranges and functions that will be apparent in light of this disclosure, may be hard-coded or user-configured (e.g., using a configuration sub-menu with check boxes or drop down menus like the one shown in FIG. 1e).

As can be further seen, a back button arrow UI control feature may be provisioned on the screen for any of the menus provided, so that the user can go back to the previous menu, if so desired. Note that configuration settings provided by the user can be saved automatically (e.g., user input is saved as selections are made or otherwise provided). Alternatively, a save button or other such UI feature can be provisioned, which the user can engage as desired. The configuration sub-menu shown in FIG. 1 e is presented merely as an example of how a stylus angle detection mode may be configured by the user, and numerous other configurable or hard-codable aspects will be apparent in light of this disclosure. For example, in some embodiments, the stylus angle detection function can be assigned on a context basis. For instance, the configuration menu may allow the user to assign one span of stylus angles to copy entire files or entails and assign another span of stylus angles to copy within a given file. Thus, the techniques provided herein can be implemented on a global level, a content-based level, or an application level, in some example cases. Note that in some embodiments the various stylus angle functions may be visually demonstrated to the user as they are carried out via scroll, copy, delete, or other suitable function animations. Such animations provide clarity to the function being performed, and in some embodiments the animations may be user-configurable while they may be hard-coded in other embodiments.

Figure 2A:
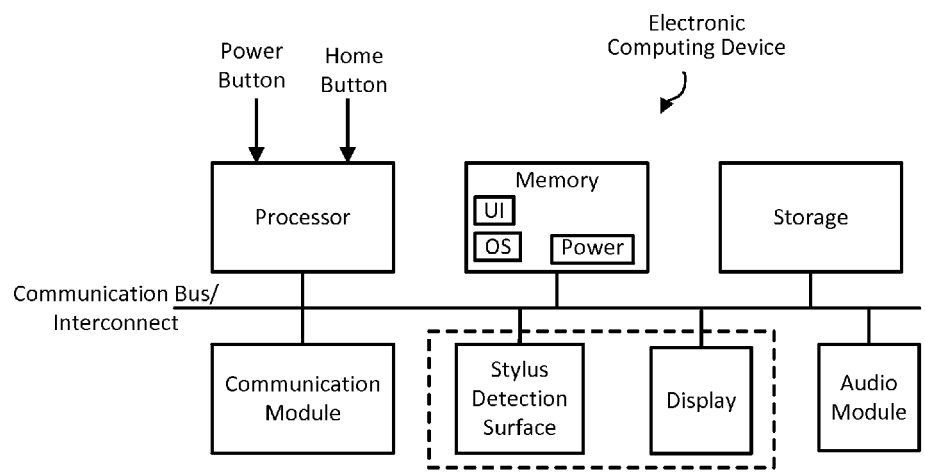
FIG. 2a illustrates a block diagram of an electronic computing device with a stylus sensitive display, configured in accordance with an embodiment of the present invention.

FIG. 2a illustrates a block diagram of an electronic computing device with a stylus sensitive display, configured in accordance with an embodiment of the present invention. As can be seen, this example device includes a processor, memory (e.g., RAM and/or ROM for processor workspace and storage), additional storage/memory (e.g., for content), a communications module, a display, a stylus detection surface, and an audio module. A communications bus and interconnect is also provided to allow inter-device communication. Other typical componentry and functionality not reflected in the block diagram will be apparent (e.g., battery, co-processor, etc.). Further note that in some embodiments the stylus detection surface may be integrated into the device display. Alternatively, the stylus detection surface may include a track pad, a housing configured with one or more acoustic sensors, a separate stylus sensitive surface that may be connected to the device via cables or a wireless link, etc. As discussed above, the stylus detection surface may employ any suitable input detection technology that is capable of translating a stylus angle change with respect to the detection surface into an electronic signal that can be manipulated or otherwise used to trigger a specific user interface action, such as those provided herein. The principles provided herein equally apply to any such stylus sensitive devices. For ease of description, examples are provided with stylus sensitive displays.

In this example embodiment, the memory includes a number of modules stored therein that can be accessed and executed by the processor (and/or a co-processor). The modules include an operating system (OS), a user interface (UI), and a power conservation routine (Power). The modules can be implemented, for example, in any suitable programming language (e.g., C, C++, objective C, JavaScript, custom or proprietary instruction sets, etc), and encoded on a machine readable medium, that when executed by the processor (and/or co-processors), carries out the functionality of the device including a UI having a stylus angle detection mode as described herein. The computer readable medium may be, for example, a hard drive, compact disk, memory stick, server, or any suitable non-transitory computer/computing device memory that includes executable instructions, or a plurality or combination of such memories. Other embodiments can be implemented, for instance, with gate-level logic or an application-specific integrated circuit (ASIC) or chip set or other such purpose built logic, or a microcontroller having input/output capability (e.g., inputs for receiving user inputs and outputs for directing other components) and a number of embedded routines for carrying out the device functionality. In short, the functional modules can be implemented in hardware, software, firmware, or a combination thereof.

The processor can be any suitable processor (e.g., 800 MHz Texas Instruments OMAP3621 applications processor), and may include one or more co-processors or controllers to assist in device control. In this example case, the processor receives input from the user, including input from or otherwise derived from the power button and the home button. The processor can also have a direct connection to a battery so that it can perform base level tasks even during sleep or low power modes. The memory (e.g., for processor workspace and executable file storage) can be any suitable type of memory and size (e.g., 256 or 512 Mbytes SDRAM), and in other embodiments may be implemented with non-volatile memory or a combination of non-volatile and volatile memory technologies. The storage (e.g., for storing consumable content and user files) can also be implemented with any suitable memory and size (e.g., 2 GBytes of flash memory). The display can be implemented, for example, with a 6-inch E-ink Pearl 800×600 pixel screen with Neonode® zForce®, touch screen, or any other suitable display and touch screen interface technology. The communications module can be configured to execute, for instance, any suitable protocol which allows for connection to the stylus so that the stylus angle may be detected by the device, or to otherwise provide a communication link between the device and the stylus or other external systems. Note in some cases that actions of the stylus are communicated to the device by virtue of the stylus detection surface and not the communication module. Example communications modules may include an NFC (near field connection), Bluetooth, 802.11 b/g/n WLAN, or other suitable chip or chip set that allows for wireless connection to the stylus (including any custom or proprietary protocols). In some embodiments, a wired connection can be used between the stylus and device. In some specific example embodiments, the device housing that contains all the various componentry measures about 6.5"high by about 5"wide by about 0.5"thick, and weighs about 6.9 ounces. Any number of suitable form factors can be used, depending on the target application (e.g., laptop, desktop, mobile phone, etc). The device may be smaller, for example, for smartphone and tablet applications and larger for smart computer monitor applications.

The operating system (OS) module can be implemented with any suitable OS, but in some example embodiments is implemented with Google Android OS or Linux OS or Microsoft OS or Apple OS. As will be appreciated in light of this disclosure, the techniques provided herein can be implemented on any such platforms. The power management (Power) module can be configured as typically done, such as to automatically transition the device to a low power consumption or sleep mode after a period of non-use. A wake-up from that sleep mode can be achieved, for example, by a physical button press and/or a stylus gesture, a touch screen swipe or other action. The user interface (UI) module can be, for example, based on touchscreen and stylus detection technology and the various example screen shots and use-case scenarios shown in FIGS. 1a, 1d-e. 3a-b', 4a-c', 5a-c', 6a-c', and 7a-b in conjunction with the stylus angle change methodologies demonstrated in FIG. 8, which will be discussed in turn. The audio module can be configured, for example, to speak or otherwise aurally present a selected eBook table of contents or other textual content, if preferred by the user. Numerous commercially available text-to-speech modules can be used, such as Verbose text-to-speech software by NCH Software. In some example cases, if additional space is desired, for example, to store digital books or other content and media, storage can be expanded via a microSD card or other suitable memory expansion technology (e.g., 32 GBytes, or higher). Further note that although a touch screen display is provided, other embodiments may include a non-touch screen and a stylus sensitive surface such as a track pad, or a stylus sensitive housing configured with one or more acoustic sensors, etc.

Figure 2B:
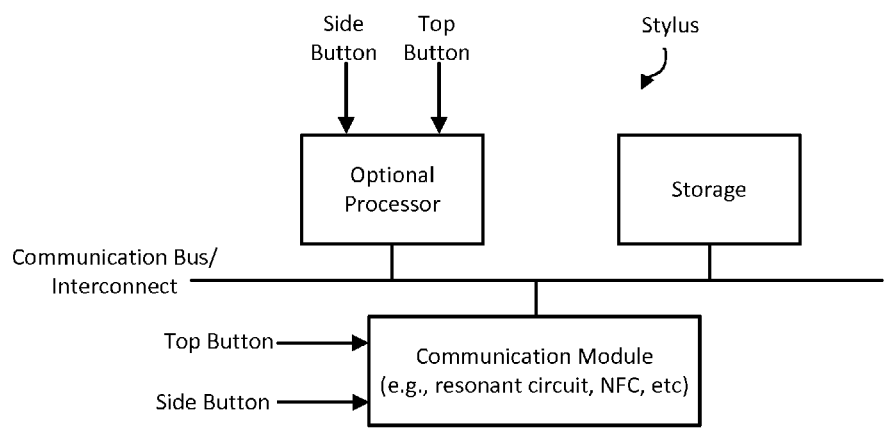
FIG. 2b illustrates a block diagram of a stylus configured in accordance with an embodiment of the present invention.

FIG. 2b illustrates a block diagram of a stylus configured in accordance with an embodiment of the present invention. As can be seen, this example stylus includes a storage/memory and a communication module. A communications bus and interconnect may be provided to allow inter-device communication. An optional processor may also be included in the stylus to provide local intelligence, but such is not necessary in embodiments where the electronic computing device with which the stylus is communicatively coupled provides the requisite control and direction. Other componentry and functionality not reflected in the block diagram will be apparent (e.g., battery, speaker, antenna, etc). The optional processor can be any suitable processor and may be programmed or otherwise configured to assist in controlling the stylus, and may receive input from the user from control features including a top and side button. The storage may be implemented with any suitable memory and size (e.g., 2 to 4 GBytes of flash memory). In other example embodiments, storage/memory on the stylus itself may not be necessary.

The communications module can be, for instance, any suitable module which allows for connection to a nearby electronic device so that information may be passed between the device and the stylus. Example communication modules may include an NFC, Bluetooth, 802.11 b/g/n WLAN, or other suitable chip or chip set which allows for connection to the electronic device. In other embodiments, the communication module of the stylus may implement EMR or other similar technologies that can communicate stylus information to a device, including stylus location and the angle between the stylus and the device, without a separate communications chip or chip set. In one such example, the stylus may include a communication module comprising a resonator circuit that effectively interacts with the device sensor grid. In such an example, the angle of the stylus can be determined using an EMR digitizer loop architecture implemented in the stylus detection surface of the device. For instance, each stylus angle of the overall detectable range of angles is generally associated with a given response signal, wherein the resonant frequency of the stylus tank circuit can then be picked up by a transmit/receive coil(s) of the digitizer included in the stylus detection surface, assuming an EMR-based detection scheme. In such cases, the resonant frequency may be detected by the stylus detection surface of the device, and the stylus angle information is known therefrom (based on angle of incidence on digitizer), thus triggering an appropriate stylus angle-based response at the device. In a more general sense, an EMR detection grid on the stylus detection surface of the device may monitor the angle of the stylus and detect when the angle between the stylus and the device changes, thus triggering a response at the device. Note in such a case that a separate dedicated communication module on the electronic computing device and stylus may be optional.

In another example case, the stylus may have an angle computation module on-board (e.g., executing in optional processor that works in conjunction with one or more sensors to detect relative and/or absolute angle changes) and the communications module (e.g., Bluetooth link, etc) may be used to communicate the computed stylus angle changes back to the device, wherein such inputs can be used to enable the various functions of the communications module. In still other embodiments, a UI-based calibration routine can be used to allow the user to assign specific stylus positions and angles with specific functions. In one such embodiment, a stylus angle calibration routine can be executed on the device and display a user interface that lets the user select from a list of desired functions in real-time while executing a given stylus angle/position. Thus, for each stylus angle/position presented to the device by the user, a desired function can be assigned.

As will be further appreciated, commands may be communicated and/or target content may be transferred between (e.g., copied or cut or pasted) the stylus and the electronic device over a communication link. In one embodiment, the stylus includes memory storage and a transceiver, but no dedicated processor. In such an embodiment, the processor of the electronic device communicates with the transceiver of the stylus and performs the various functions as indicated by the user.

Figure 2C:
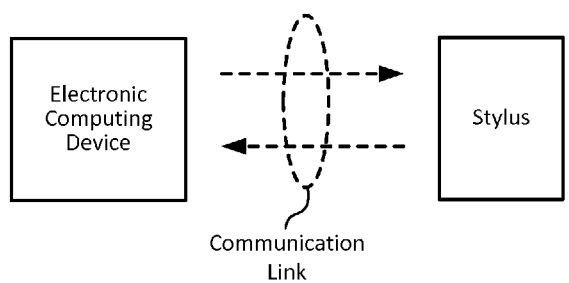
FIG. 2c illustrates a block diagram of a communication link between the electronic computing device of FIG. 2a and the stylus of FIG. 2b, configured in accordance with an embodiment of the present invention.

FIG. 2c illustrates a block diagram showing a communication link between the electronic computing device of FIG. 2a and the stylus of FIG. 2b, according to one embodiment of the present invention. As can be seen, the system generally includes an electronic computing device that is capable of wirelessly connecting to other devices and a stylus that is also capable of wirelessly connecting to other devices. In this example embodiment, the electronic computing device may be, for example, an e-Book reader, a mobile cell phone, a laptop, a tablet, desktop, or any other stylus sensitive computing device. As described above, the communication link may include an NFC, Bluetooth, 802.11 b/g/n WLAN, electro-magnetic resonance, or other suitable communication link which allows for communication between one or more electronic devices and a stylus. In some embodiments EMR technology may be implemented along with one or more of NFC, Bluetooth, 802.11 b/g/n WLAN, etc. In one such example, EMR may be used to power a stylus, track its location above a device, and calculate the angle between the stylus and the device, while NFC may enable data transfer between the stylus and the device. In some embodiments, the stylus may be configured and/or recalibrated in real-time over the communication link. In one such example, the user may adjust stylus configuration settings using the various menus and sub-menus such as those described in FIGS. 1d-e and the stylus may be reconfigured in real-time over the communication link.

Example Stylus Angle Functions

Figure 3A:
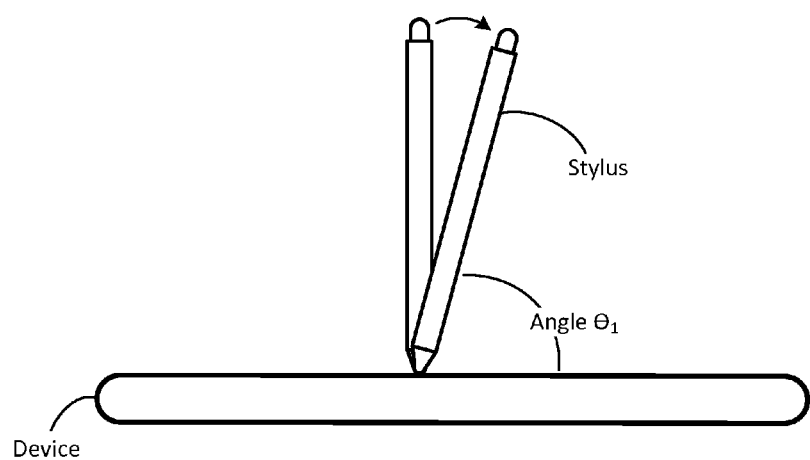
FIGS. 3a-b' illustrate an example of an electronic stylus sensitive device and stylus having a stylus angle detection mode, in accordance with an embodiment of the present invention.
Figure 3A:
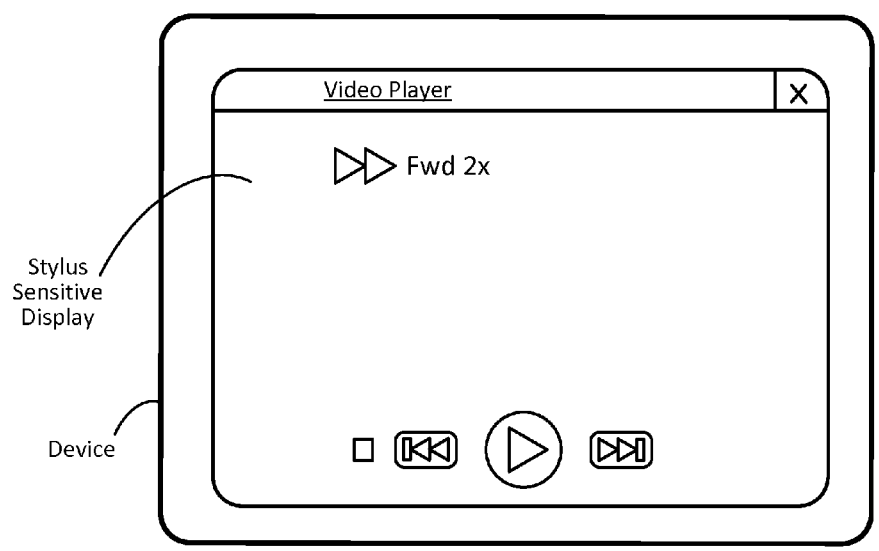
Figure 3B:
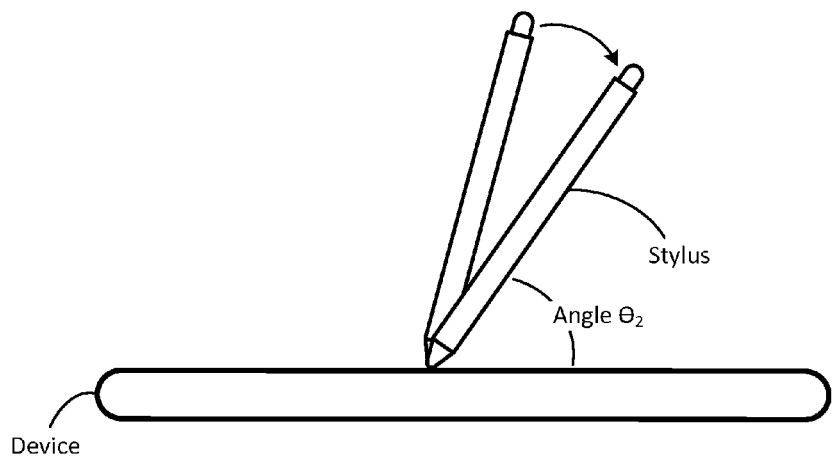
Figure 3B:
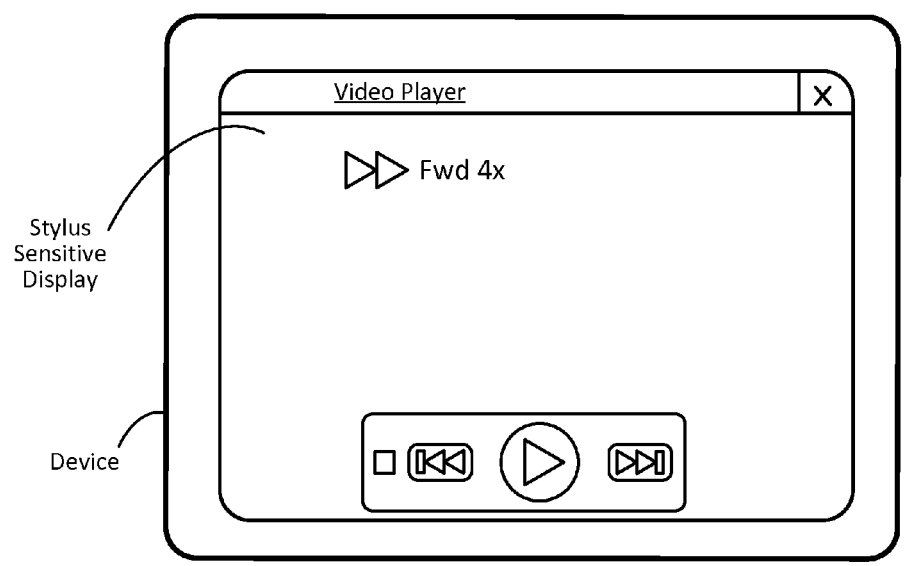

FIGS. 3a-b' illustrate an example of an electronic stylus sensitive device and stylus having a stylus angle detection mode, in accordance with an embodiment of the present invention. As can be seen, a physical frame or support structure is provided about the stylus sensitive display. In this particular example scenario, the stylus angle detection mode is associated with adjusting video playback speed (e.g., hard-coded or via a configuration sub-menu) and the user is inclining the stylus further to the right with respect to the content displayed on the device. In this example case, a video player is running, the stylus angle detection mode is enabled (e.g., as described in reference to FIG. 1e, or hard-coded), and the user has placed the stylus tip on the stylus sensitive display (or sufficiently proximate thereto). As seen in FIG. 3a, the angle between the stylus and the device surface is measured as angle $\theta_1$ between the x-axis and z-axis, and this angle determines the video playback speed in this particular example. FIG. 3a' shows the video player application when the stylus is inclined to the right (toward the positive x-axis) at angle $\theta_1$. In this particular example, the video player is configured to fast-forward at double speed when the stylus is inclined to the right at angle $\theta_1$. Further inclining the stylus in this particular example accelerates the fast-forward function. In the example shown in FIGS. 3b-b', when the user inclines the stylus further to the right to angle $\theta_2$, the video fast-forward speed increases to four times normal speed, as shown. In other embodiments the stylus angle detection mode functions may be accompanied by graphics or sounds, or a combination of graphics and sounds.

In this particular example, the stylus angle detection mode is enabled when the stylus tip is in contact with the stylus sensitive display and the user must keep the stylus in contact with the display while the fast-forward function is being performed. In such an example case, lifting the stylus from the stylus detection surface (or releasing a stylus control feature if the stylus angle detection mode is enabled by pressing a stylus control feature) can cause the stylus angle detection mode to be abandoned. In one such example, if the user is fast-forwarding through a video by changing the stylus' angle of inclination, lifting the stylus sufficiently away from the stylus detection surface may stop the fast-forwarding function and pause the video or begin normal video playback.

Figure 4A:
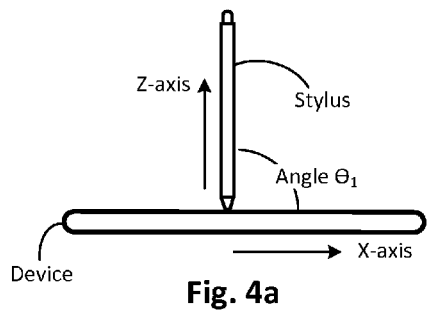
FIGS. 4a-c' illustrate an example of an electronic stylus sensitive device and stylus having a stylus angle detection mode, in accordance with an embodiment of the present invention.
Figure 4A:
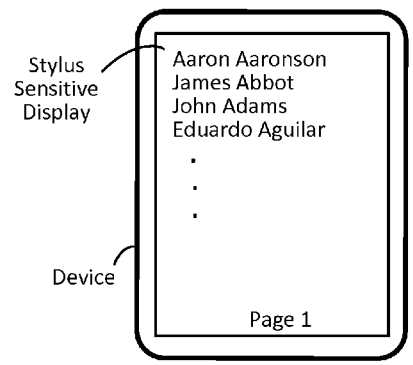
Figure 4B:
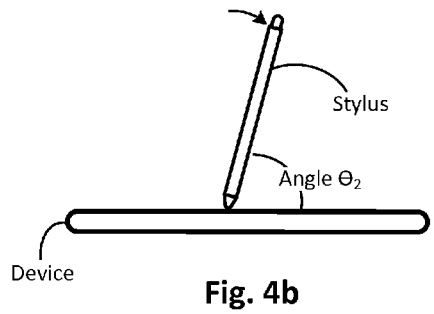
Figure 4B:
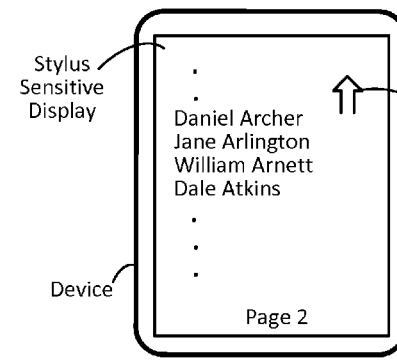
Figure 4C:
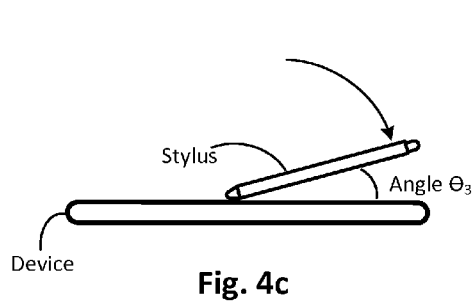
Figure 4C:
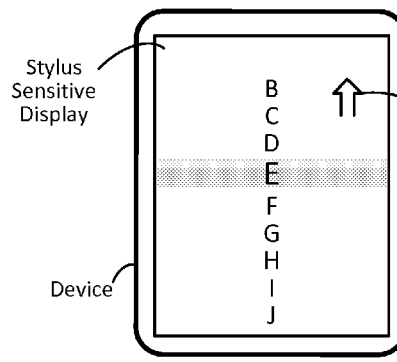

FIGS. 4a-c' illustrate an example of an electronic stylus sensitive device and stylus having a stylus angle detection mode, in accordance with another embodiment of the present invention. As can be seen, a physical frame or support structure is provided about the stylus sensitive display. In this particular example scenario, the stylus angle detection mode is associated with adjusting scrolling speed (e.g., hard-coded or via a configuration sub-menu) and the user is inclining the stylus further to the right with respect to the content displayed on the device. In this example case the user is viewing an address book with a list of names, and the user has placed the stylus tip on (or sufficiently proximate to, say within 3 centimeters) the stylus sensitive display. As seen in FIG. 4a, the angle between the stylus and the device surface is measured as angle $\theta_1$ between the x-axis and z-axis, and this angle determines the scrolling speed in this particular example. FIG. 4a' shows the device display when the stylus is at angle $\theta_1$, which is 90° in this example, and therefore the device is displaying page 1 of the address book without scrolling.

In this particular example, the device is configured to scroll through the names of the address book when the stylus is inclined further to the right (toward the x-axis), and FIG. 4b shows the stylus inclined at angle $\theta_2$. FIG. 4b' of this example shows the device screen when the stylus is at angle $\theta_2$, and the device is scrolling through the names of the address book and currently displaying page 2. Further inclining the stylus in this particular example accelerates the scrolling function. In the example shown in FIGS. 4c-c', when the user inclines the stylus further to the right to angle $\theta_3$, the device begins scrolling through the contents of the address book in alphabetic groups rather than one name at a time. In some embodiments the scrolling function may be accompanied by sounds, or graphics, or a combination of graphics and sounds. In this example embodiment, the current letter being scrolled through is the letter "E" and is highlighted, indicating to the user that ceasing the stylus angle gesture at this moment will bring up the names with the last letter beginning with "E."

Figure 5A:
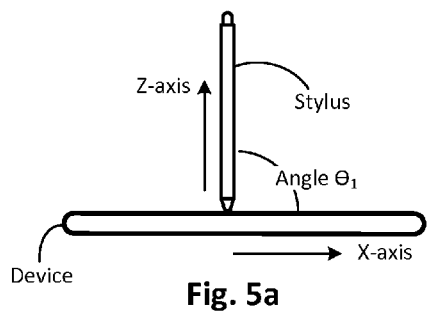
FIGS. 5a-c' illustrate an example of an electronic stylus sensitive device and stylus having a stylus angle detection mode, in accordance with an embodiment of the present invention.
Figure 5A:
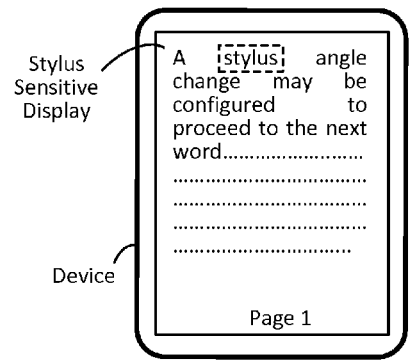
Figure 5B:
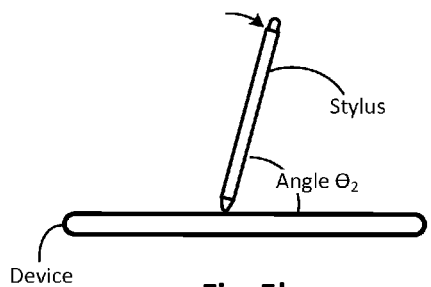
Figure 5B:
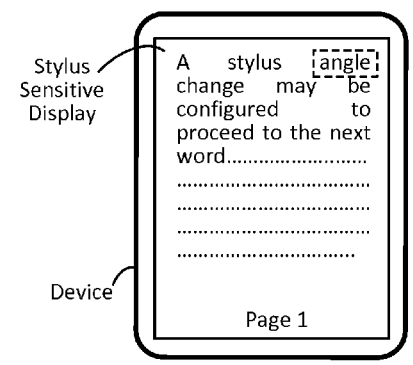
Figure 5C:
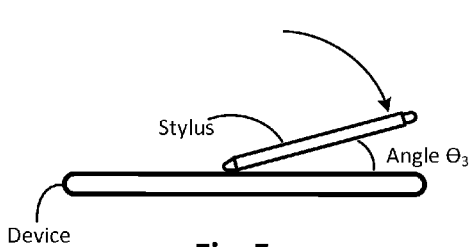
Figure 5C:
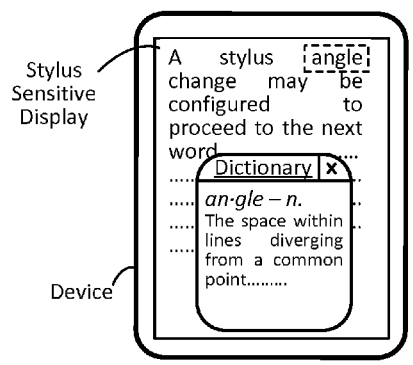

FIGS. 5a-c' illustrate an example of an electronic stylus sensitive device and stylus having a stylus angle detection mode, in accordance with another embodiment of the present invention. As can be seen, a physical frame or support structure is provided about the stylus sensitive display. In this particular example scenario, the stylus angle detection mode is associated with scrolling through words of an eBook application, as well as looking up a selected word in the dictionary (e.g., hard-coded or via a configuration sub-menu). In this example case the user is viewing page 1 of an eBook, the word "stylus" is currently selected as indicated by the dashed box surrounding it, and the user has placed the stylus tip on the stylus sensitive display (or sufficiently proximate thereto, depending on the detection range of the stylus detection circuitry employed). As seen in FIG. 5a, the angle between the stylus and the device surface is measured as angle $\theta_1$ between the x-axis and z-axis, and this angle determines the word-by-word scrolling speed in this particular example. FIG. 5a' shows the device when the stylus is at angle $\theta_1$, which is 90° in this example, and therefore the device is displaying page 1 of the eBook.

In this particular example, the device is configured to scroll through the words of the eBook when the stylus is inclined further to the right (toward the positive x-axis), and FIG. 5b shows the stylus inclined at angle $\theta_2$. FIG. 5b' of this example shows the device screen when the stylus is at angle $\theta_2$, and currently the word "angle" is selected, as indicated by the dashed box. Further inclining the stylus in this particular example performs a separate function from scrolling through the words of the eBook. In the example shown in FIGS. 5c-c', when the user inclines the stylus further to angle $\theta_3$, the device pulls up a dictionary application and looks up the definition of the currently selected word "angle." In some embodiments the scrolling and look up functions may be accompanied by sounds, or graphics, or a combination of graphics and sounds.

Figure 6A:
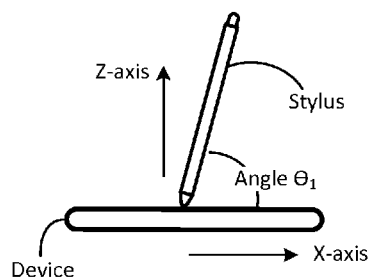
FIGS. 6a-c' illustrate an example of an electronic stylus sensitive device and stylus having a three-dimensional stylus angle detection mode, in accordance with an embodiment of the present invention.
Figure 6A:
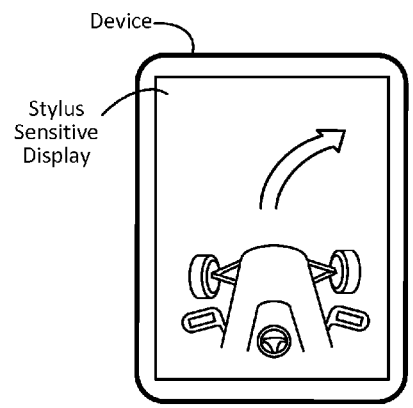
Figure 6B:
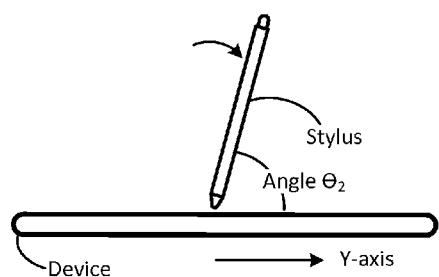
Figure 6B:
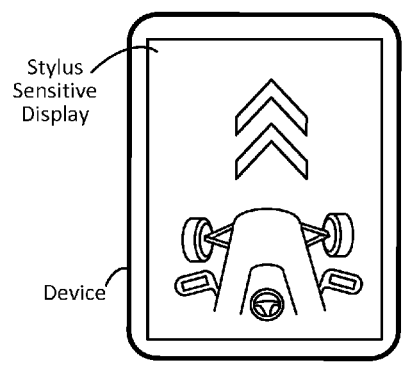
Figure 6C:
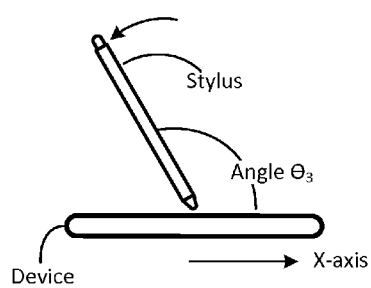
Figure 6C:
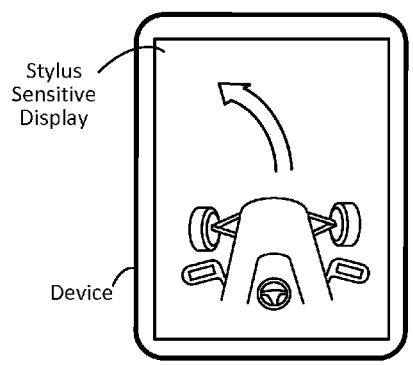

FIGS. 6a-c' illustrate an example of an electronic stylus sensitive device and stylus having a three-dimensional stylus angle detection mode, in accordance with an embodiment of the present invention. As can be seen, a physical frame or support structure is provided about the stylus sensitive display. In this particular example scenario, the stylus angle detection mode is associated with controlling a car in a video game application (e.g., hard-coded or via a configuration sub-menu). In such an example, the three-dimensional stylus angle detection mode is configured to calculate stylus angles in both the x-z and y-z planes and associate those angles with different functions within the application. More specifically, in this example embodiment the stylus angles in the x-z plane are associated with turning the car to the right or left, while the stylus angles in the y-z plane are associated with accelerating the car forward or in reverse. Inclining the stylus toward the positive x-axis will make the car turn to the right, inclining the stylus toward the negative x-axis will make the car turn to the left, inclining the stylus toward the positive y-axis will make the car accelerate forward, and inclining the stylus toward the negative y-axis will make the car go in reverse. In one such embodiment, greater stylus inclinations may result in accelerating, decelerating, or turning more sharply.

In the example shown in FIGS. 6a-a', the user has placed the stylus tip on the stylus sensitive surface (or otherwise sufficiently proximate thereto so as to allow for stylus angle detection). The angle between the stylus and the device along the x-z plane is measured as angle $\theta_1$. Because the stylus is inclined toward the positive x-axis (meaning that the angle in the x-z plane is <90°), the car shown in FIG. 6a' is being directed to drive to the right. Further inclining the stylus toward the positive x-axis will result in a sharper turn to the right, in this example embodiment. In the example shown in FIGS. 6b-b', the user has inclined the stylus forward toward the positive y-axis (meaning that the angle in the y-z plane is <90°). The angle between the stylus and the device along the y-z plane is measured as angle $\theta_2$. Because the stylus is inclined toward the positive y-axis, the car shown in FIG. 6a' is accelerating forward. Further inclining the stylus toward the positive y-axis will make the car accelerate faster, while inclining the stylus toward the negative y-axis will cause the car to drive in reverse, in this example embodiment. When the stylus is in the home position (e.g., substantially normal to stylus detection surface), the car can be stationary. In the example shown in FIGS. 6c-c', the user has inclined the stylus toward the negative x-axis. The angle between the stylus and the device along the x-z plane is measured as angle $\theta_3$. Because the stylus is inclined toward the negative x-axis (meaning that the angle in the x-z plane is >90°), the car shown in FIG. 6c' is being directed to drive to the left. Further inclining the stylus toward the negative x-axis will result in a sharper turn to the left. In some embodiments the angle-based control function may be accompanied by sounds (e.g., roaring engine for faster, squealing brakes for slower, etc), or graphics (e.g., smoking tires, changing scenery, etc), or a combination of such graphics and sounds.

Figure 7A:
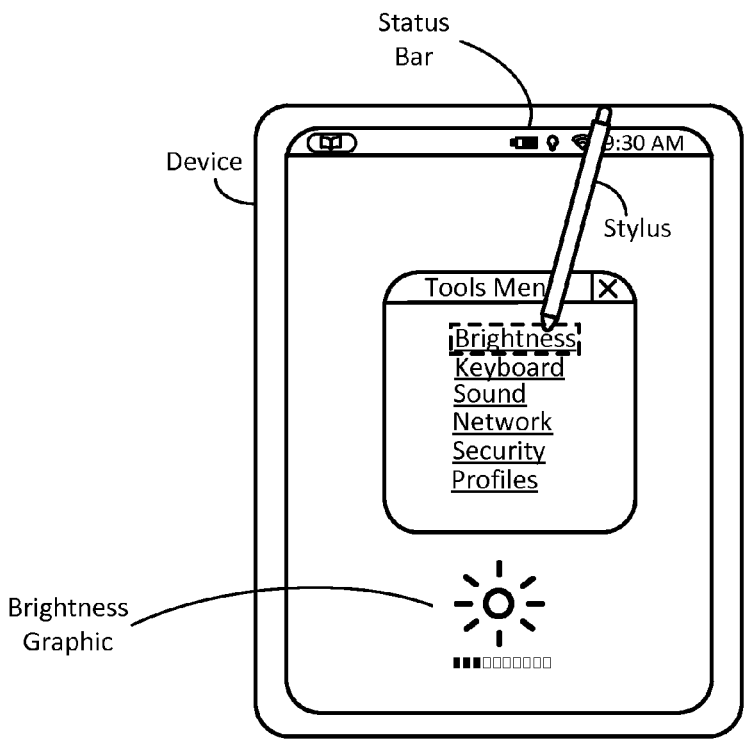
FIGS. 7a-b illustrate an example of an electronic stylus sensitive device and stylus having a targeted stylus angle detection mode, in accordance with an embodiment of the present invention.
Figure 7B:
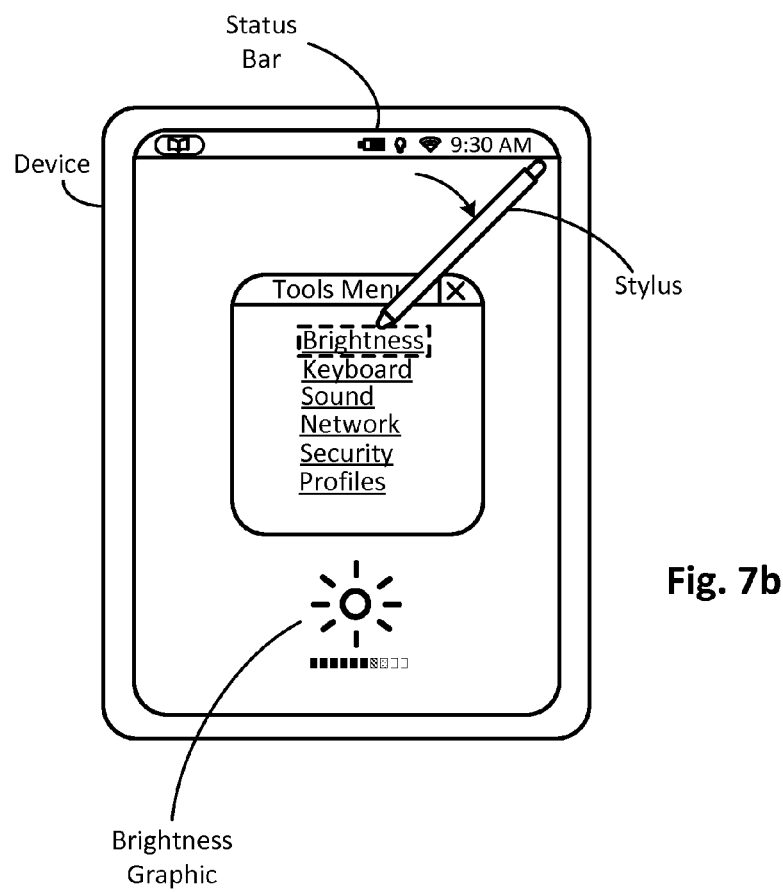

FIGS. 7a-b illustrate an example of an electronic stylus sensitive device and stylus having a targeted stylus angle detection mode, in accordance with another embodiment of the present invention. As can be seen, a physical frame or support structure is provided about the stylus sensitive display. In this particular example scenario, the stylus angle detection mode is associated with performing an action on a targeted icon or UI feature (e.g., hard-coded or via a configuration sub-menu). In the example shown in FIG. 7a, the user is viewing a tools menu of the device, the stylus is pointing to the brightness setting within the tools menu, and the stylus angle detection mode is enabled (e.g., as described in reference to FIG. 1e, or hard-coded). Note that in some embodiments the stylus does not necessarily begin in a perpendicular position with respect to the display surface. In this particular example, the stylus angle detection mode is configured to adjust the screen brightness when the stylus is pointed at the brightness setting within the tools menu. Once the stylus contacts the screen above the brightness icon (or is otherwise sufficiently close thereto), a graphic appears below the tools menu showing the current screen brightness level. As seen in FIG. 7b, when the user further inclines the stylus to the right, the screen brightness increases, as shown by the increasing value bar of the brightness graphic. As the user further inclines the stylus, the brightness may increase at a greater rate, or another function may be performed. Similarly, in some embodiments if the user were to incline the stylus to the left, the brightness value would decrease.

Methodology

Figure 8:
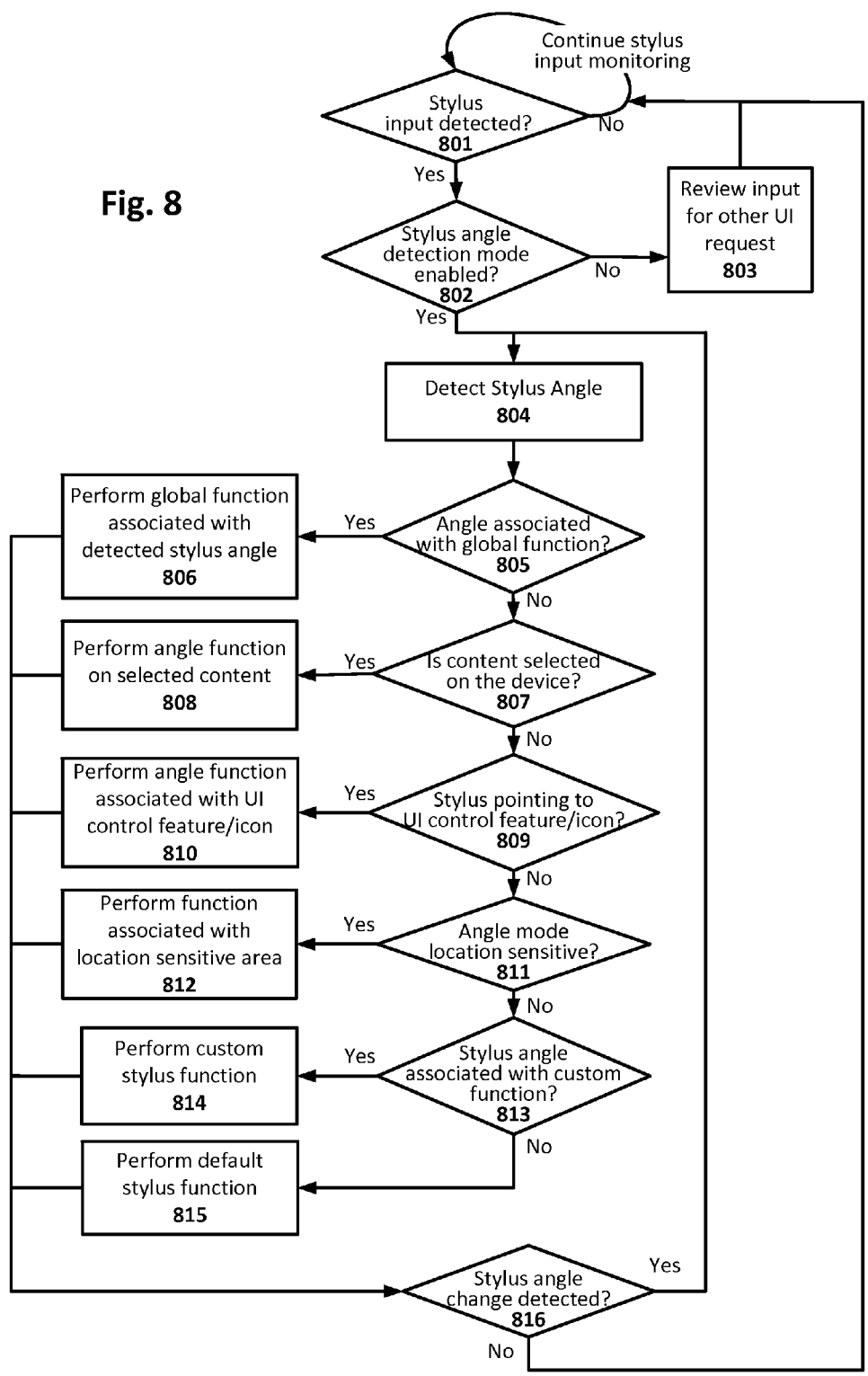
FIG. 8 illustrates a method for performing functions in electronic devices using a stylus angle detection mode, in accordance with an embodiment of the present invention.

FIG. 8 illustrates a method for performing functions in electronic devices using a stylus angle detection mode, in accordance with an embodiment of the present invention. This example methodology may be implemented, for instance, by the UI module of the electronic computing device shown in FIG. 2a. To this end, the UI module can be implemented in software, hardware, firmware, or any combination thereof, as will be appreciated in light of this disclosure. The various stylus angle based actions may be communicated to the device over a communication link (e.g., EMR link, and/or dedicated communication link such as NFC or Bluetooth).

In general, any stylus sensitive surface may be used to detect the angle between the stylus and the device surface. As discussed above, EMR or other suitable technology may be implemented to detect the presence of a stylus and its angle of inclination, as well as to communicate stylus movements to the electronic device. In one particular example, EMR technology may be implemented to power a stylus and/or provide angle detection signals that allow a processor of the device to calculate the stylus' angle of inclination. In one such example, a stylus angle change effectively manipulates the resonant circuit within the stylus which may in turn be detected by the antenna coils of the stylus detection grid of the device, thus triggering a response at the device. Various stylus angle changes thus create different detection signals, and thus may be assigned distinct functions. To this end, stylus angle detections can be used to implement UI functionality.

In this example case, the method includes determining 801 whether stylus input has been received, which may include a physical stylus contact on the stylus detection surface, or input received when the stylus is hovering over or is otherwise sufficiently proximate to the stylus detection surface. In some embodiments, monitoring for stylus input includes monitoring all or part of a stylus sensitive display screen. In general, the stylus-based input monitoring is effectively continuous, and once a stylus input has been detected, the method may continue with determining 802 whether the stylus angle detection mode is enabled. In some embodiments, the stylus angle detection mode is always enabled, while in other embodiments it may be enabled using a stylus control feature, an initial stylus tap, or it may only be enabled for particular applications or functions. If the stylus angle detection mode is not enabled, the method may continue with reviewing 803 the stylus input for other UI requests. If the stylus angle detection mode is enabled, the method may continue with determining 804 the angle between the stylus and the stylus detection surface. As previously explained, the angle can be determined based on any number of suitable technologies, such as EMR, a calibration routine that correlates stylus orientation to a look-up table of known angles, off-the-shelf inclination sensors, or any other technology that provides a signal that can be correlated to a particular angle or range of angles within a given two-dimensional or three-dimensional space, as will be appreciated in light of this disclosure.

After the stylus angle has been determined, the method may continue with determining 805 whether the stylus angle detection mode is associated with a global function. If the stylus angle is associated with a global function, the method may continue with performing 806 the global function associated with the determined stylus angle. If the stylus angle detection mode is not associated with a global function, the method may continue with determining 807 whether content has been selected on the electronic device. In some embodiments, the selected content may include, for example, a word, a section of text, a selected file or application, or any other selected content displayed on the electronic device. Note that in some cases, the mere act of pointing the stylus at the target content effectively amounts to selecting that content, without anything further (e.g., no highlighting). If the content is selected on the electronic device, the method may continue with performing 808 the function associated with the determined stylus angle on the selected content. The desired function may be hard-coded or user-configurable and examples may include zooming in or out, adjusting font size, looking up a word in a dictionary, scrolling through content, or any other action that may be performed on the selected content. If content on the electronic device has not been selected, the method may continue with determining 809 whether the stylus is pointing to a UI control feature or UI icon. The UI control feature or icon may include, for example, a volume icon, a slide bar, a brightness indicator, a tap point graphic, or other such UI control feature or icon that can be manipulated based on user input. If the stylus is pointing to a UI control feature or icon, the method may continue with performing 810 the angle function associated with the UI control feature or icon. Functions associated with UI control features or icons, for example, may include adjusting volume, adjusting screen brightness, selecting a tap point graphic, scrolling through a list of content, or other such corresponding functions that can be carried out with respect to a given UI control feature or icon. If the stylus is not pointing at a UI control feature or icon, the method may continue with determining 811 whether the stylus angle detection mode is location sensitive. If the stylus angle detection mode is location sensitive, the method may continue with performing 812 a function associated with the location sensitive area of the electronic device. A location sensitive stylus angle function may include, for example, a stylus angle change over the right side of a display which turns to the next page of an eBook application. In such a location sensitive embodiment, a similar stylus angle change over the left side of a display may perform a different function, like increasing screen brightness. Numerous other location sensitive stylus angle change gestures and functions will be apparent in light of this disclosure. If the stylus angle detection mode is not location sensitive, the method may continue with determining 813 whether the stylus angle is associated with a custom function. If the stylus angle is associated with a custom function, the method may continue with performing 814 the custom function. The custom function may be user-configurable in some instances, and may be customized on an application, content, or global level. If the stylus angle is not associated with a custom function, the method may continue with performing 815 a default stylus angle function. A default stylus angle function may be user-configurable or hard-coded, as described earlier.

After any of the stylus functions has been performed, the method may continue with further determining 816 whether a further stylus angle change has been detected. If a further stylus angle change is detected, the method may continue with determining again 804 the stylus angle and associating the new stylus angle with a function, as previously described. The stylus angle change may result in accelerating the function already being performed, or performing an entirely different function in some embodiments. If no further stylus angle change is detected, the method may continue with monitoring for further stylus inputs.

Numerous variations and embodiments will be apparent in light of this disclosure. One example embodiment of the present invention provides a system including an electronic device having a display for displaying content to a user and a stylus detection surface for allowing user input. The system also includes a user interface operable on the electronic device and including a stylus angle detection mode, wherein the stylus angle detection mode is configured to determine a stylus angle of inclination over the stylus detection surface and is configured to perform a first function in response to a first stylus angle of inclination, and to perform one or more subsequent functions in response to one or more subsequent stylus angles of inclination. In some cases, the system includes a stylus, wherein the stylus is configured to wirelessly communicate with the electronic device. In some such cases, the stylus further includes at least one of a processor configured to direct stylus functionality and a memory configured to store at least one of data received from the electronic device, stylus configuration data, and/or data to be transmitted to the electronic device. In some cases, the user interface is further configured to calibrate and/or configure the stylus in real-time over a wireless communication link to the stylus. In some cases, the stylus angle detection mode is enabled in response to a stylus-based control feature. In some cases, the one or more subsequent functions includes at least one of accelerating and/or decelerating a rate of the first function. In some cases, the first function includes at least one of zooming in or out of a page, adjusting font size, adjusting volume, adjusting screen brightness, scrolling through content, adjusting audio/video playback speed, and/or navigating content. In some cases, the stylus detection surface includes at least one set of antenna coils configured to interact with a resonant circuit within the stylus. In some cases, the stylus detection surface further includes a second set of antenna coils configured to detect the stylus' angle of inclination over the stylus detection surface. In some cases, the function performed by the stylus angle detection mode is user-configurable. In some cases, the electronic device is further configured to provide at least one of an audio and/or visual notification associated with a function. In some cases, the function performed by the stylus angle detection mode is determined based on the location of the stylus over the stylus detection surface. In some cases, the display comprises a stylus sensitive display. In some cases, the electronic device is an eReader device or a tablet computer or a smartphone. Numerous variations will be apparent. For instance, another embodiment provides a mobile computing device that includes the system as variously defined in this paragraph.

Another example embodiment of the present invention provides a system including a stylus. The system also includes an electronic device having a display for displaying content to a user and a stylus detection surface for allowing user input via the stylus. The system also includes a user interface executable on the device and including a stylus angle detection mode, wherein the stylus angle detection mode is configured to determine an angle of inclination between the stylus and the stylus detection surface, and is further configured to perform a first function in response to a first angle of inclination and to perform one or more subsequent functions in response to one or more subsequent angles of inclination.

Another example embodiment of the present invention provides a computer program product including a plurality of instructions non-transiently encoded thereon to facilitate operation of an electronic device according to a process. The computer program product may include one or more computer readable mediums such as, for example, a hard drive, compact disk, memory stick, server, cache memory, register memory, random access memory, read only memory, flash memory, or any suitable non-transitory memory that is encoded with instructions that can be executed by one or more processors, or a plurality or combination of such memories. In this example embodiment, the process is configured to determine an angle of inclination between a stylus and a stylus detection surface of the electronic device; perform a first function in response to a first angle of inclination; and perform one or more subsequent functions in response to one or more subsequent angles of inclination. In some cases, the first function includes at least one of zooming in or out of a page, adjusting font size, adjusting volume, adjusting screen brightness, scrolling through content, adjusting audio/video playback speed, and/or navigating content. In some cases, the one or more subsequent functions includes at least one of accelerating and/or decelerating the rate of the first function. In some cases, the angle of inclination between the stylus and the stylus detection surface is determined by determining the location of a resonant circuit within the stylus.

The foregoing description of the embodiments of the invention has been presented for the purposes of illustration and description. It is not intended to be exhaustive or to limit the invention to the precise form disclosed. Many modifications and variations are possible in light of this disclosure.

It is intended that the scope of the invention be limited not by this detailed description, but rather by the claims appended hereto.

What is claimed is:

1. A system, comprising:
an electronic device having a display for displaying content to a user and a stylus detection surface for allowing user input; and
a user interface operable on the electronic device and comprising a stylus angle detection mode, wherein the stylus angle detection mode is configured to perform a first function in response to a first stylus angle of inclination, and to perform one or more subsequent functions in response to one or more subsequent stylus angles of inclination;
wherein:
the first function performed at the first stylus angle of inclination is scrolling through pages of paginated content at a first rate;
the one or more subsequent functions in response to one or more subsequent stylus angles of inclination includes a second function performed at a second stylus angle greater than the first stylus angle, the second function being scrolling through the pages of the paginated content at a second rate less than the first rate; and
the stylus angle is measured with respect to an axis perpendicular to the display of the electronic device.

2. The system of claim 1 further comprising a stylus.

3. The system of claim 2 wherein the stylus further comprises at least one of a processor configured to direct stylus functionality and a memory configured to store at least one of data received from the electronic device, stylus configuration data, and data to be transmitted to the electronic device.

4. The system of claim 1 wherein the user interface is further configured to at least one of calibrate and configure the stylus in real-time over a wireless communication link to the stylus.

5. The system of claim 1 wherein the electronic device is further configured to provide at least one of an audio and visual notification associated with a function.

6. The system of claim 1 wherein the stylus detection surface comprises at least one set of antenna coils configured to interact with a resonant circuit within a stylus.

7. The system of claim 6 wherein the stylus detection surface further comprises a second set of antenna coils configured to detect the stylus' angle of inclination over the stylus detection surface.

8. The system of claim 1 wherein the function performed by the stylus angle detection mode is determined based on the location of a stylus over the stylus detection surface.

9. The system of claim 1 wherein the electronic device is an eReader device or a tablet computer or a smartphone.

10. A mobile computing device comprising the system of claim 1.

11. The system of claim 1, wherein the scrolling rate increases as the stylus angle decreases.

12. A system, comprising:
an electronic device having a display for displaying content to a user and a stylus detection surface for allowing user input; and
a user interface operable on the electronic device and comprising a stylus angle detection mode, wherein the stylus angle detection mode is configured to perform a first function in response to a first stylus angle of inclination, and to perform one or more subsequent functions in response to one or more subsequent stylus angles of inclination;
wherein:
the first function performed at the first stylus angle of inclination comprises at least one of zooming in or out of a page, adjusting font size, adjusting volume, adjusting screen brightness, and adjusting audio/video playback speed at a first rate;
the one or more subsequent functions in response to one or more subsequent stylus angles of inclination includes a second function performed at a second stylus angle greater than the first stylus angle, the second function being a corresponding one of zooming in or out of a page, adjusting font size, adjusting volume, adjusting screen brightness, and adjusting audio/video playback speed at a second rate less than the first rate; and
the stylus angle is measured with respect to an axis perpendicular to the display of the electronic device.

13. The system of claim 12, wherein adjusting the font size by the first function further comprises:
increasing font size of selected text from a first font size to a second font size greater than the first font size by inclining a stylus to a first side of the electronic device; and
decreasing the font size of the selected text to a third font size smaller than the first font size by inclining the stylus to a second side of the electronic device.

14. A non-transitory computer program product comprising a plurality of instructions encoded thereon that when executed by one or more processors facilitate operation of an electronic device according to the following process, the process comprising:
determine an angle of inclination between a stylus and a stylus detection surface of the electronic device;
perform a first function in response to a first stylus angle of inclination; and
perform one or more subsequent functions in response to one or more subsequent stylus angles of inclination;
wherein:
the first function performed at the first stylus angle of inclination is scrolling through pages of paginated content at a first rate;
the one or more subsequent functions in response to one or more subsequent stylus angles of inclination includes a second function performed at a second stylus angle greater than the first stylus angle, the second function being scrolling through the pages of the paginated content at a second rate less than the first rate; and
the stylus angle is measured with respect to an axis perpendicular to a display of the electronic device.

15. The computer program product of claim 14 wherein the process further includes providing at least one of an audio and visual notification associated with a function.

16. The computer program product of claim 14 wherein the angle of inclination between the stylus and the stylus detection surface is determined by determining the location of a resonant circuit within the stylus.

17. A non-transitory computer program product comprising a plurality of instructions encoded thereon that when executed by one or more processors facilitate operation of an electronic device according to the following process, the process comprising:
determine an angle of inclination between a stylus and a stylus detection surface of the electronic device;

perform a first function in response to a first stylus angle of inclination; and perform one or more subsequent functions in response to one or more subsequent stylus angles of inclination;

wherein:
- the first function performed at the first stylus angle of inclination comprises at least one of zooming in or out of a page, adjusting font size, adjusting volume, adjusting screen brightness, and adjusting audio/video playback speed at a first rate;
- the one or more subsequent functions in response to one or more subsequent stylus angles of inclination includes a second function performed at a second stylus angle greater than the first stylus angle, the second function being a corresponding one of zooming in or out of a page, adjusting font size, adjusting volume, adjusting screen brightness, and adjusting audio/video playback speed at a second rate less than the first rate; and
- the stylus angle is measured with respect to an axis perpendicular to a display of the electronic device.

\* \* \* \* \*